United States Patent [19]

Suzumori et al.

[11] Patent Number: 4,976,191
[45] Date of Patent: Dec. 11, 1990

[54] ELASTICALLY DEFORMABLE FLUID ACTUATOR

[75] Inventors: Koichi Suzumori, Yokohama; Takafumi Matsumaru, Tokyo; Shoichi Iikura, Yokohama, all of Japan

[73] Assignee: Kabushiki Kaisha Toshiba, Kawasaki, Japan

[21] Appl. No.: 422,742

[22] Filed: Oct. 17, 1989

[30] Foreign Application Priority Data

Oct. 17, 1988 [JP] Japan .............................. 63-259391
Oct. 19, 1988 [JP] Japan .............................. 63-261314

[51] Int. Cl.$^5$ .............................................. F01B 19/00
[52] U.S. Cl. .......................................... 92/48; 92/89; 92/103 R
[58] Field of Search ................... 92/47, 48, 89, 90, 91, 92/92, 103 R

[56] References Cited

U.S. PATENT DOCUMENTS

| | | | |
|---|---|---|---|
| 2,376,634 | 5/1945 | Tellkamp | 92/91 |
| 2,456,869 | 12/1948 | Fowler | 92/91 X |
| 3,946,641 | 3/1976 | Hirmann | 92/92 X |
| 3,981,528 | 9/1976 | Andorf et al. | 294/99 |

OTHER PUBLICATIONS

G. B. Immega, "ROMAC Actuator for Micro Robots", MicroRobots & Teleoperators Workshop by IEEE Robotics and Automation Council, Nov. 9, 1987.

Primary Examiner—Allen M. Ostrager
Attorney, Agent, or Firm—Foley & Lardner, Schwartz, Jeffery, Schwaab, Mack, Blumenthal & Evans

[57] ABSTRACT

An actuator for use in an arm or hand of an industrial robot comprises a tubular elastic body of which interior is separated into a plurality of pressure chambers by an axially extending partition, and means for adjusting respective pressures of the pressure chambers to render the tubular elastic body to take a motion at a multi-degree freedom. At least the outer peripheral part of the tubular elastic body has an anisotropic characteristic with respect to modulus of elasticity. The axial direction of the tubular elastic body is a direction small in modulus of longitudinal elasticity, while the direction perpendicular to the axial direction of the tubular elastic body is a direction large in modulus of longitudinal elasticity.

46 Claims, 27 Drawing Sheets

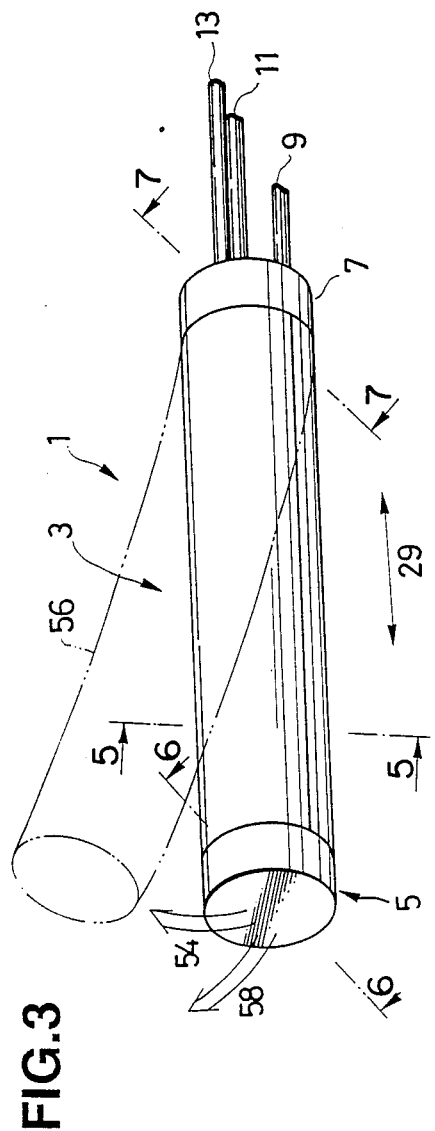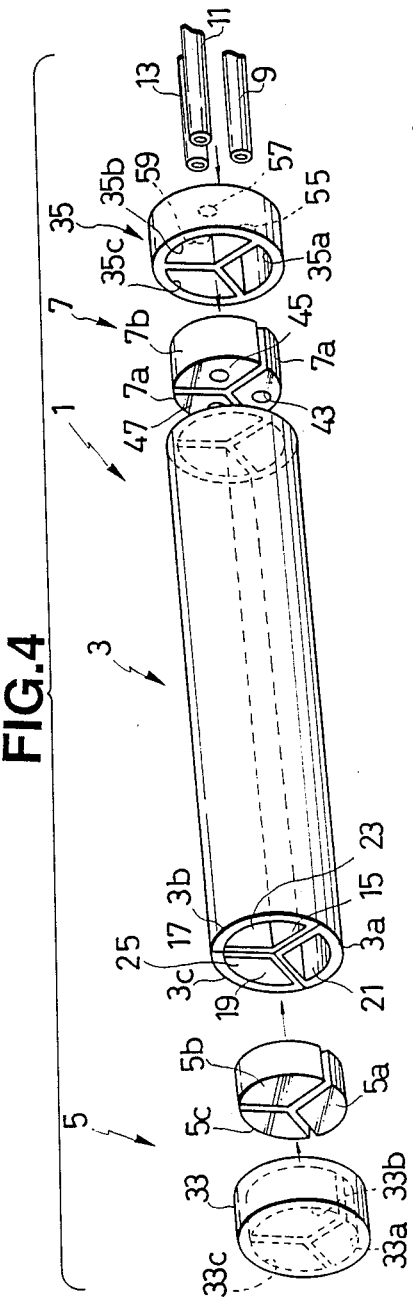

FIG..5
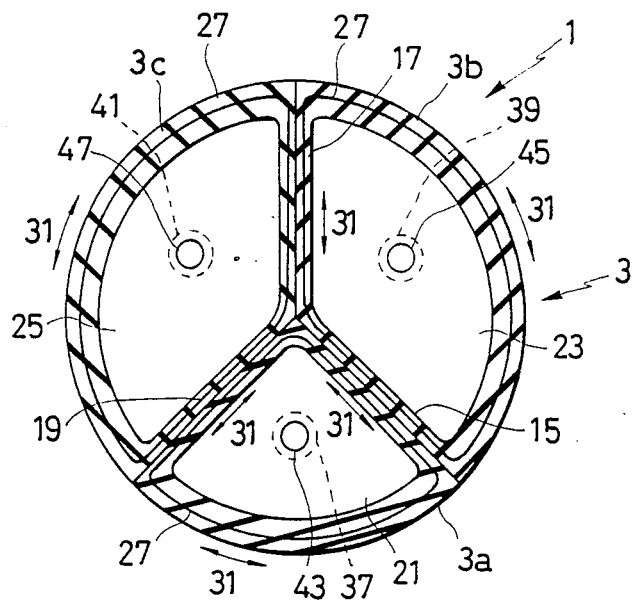
FIG.6
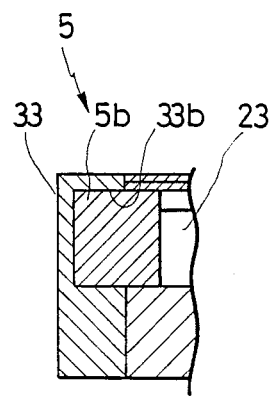
FIG.7
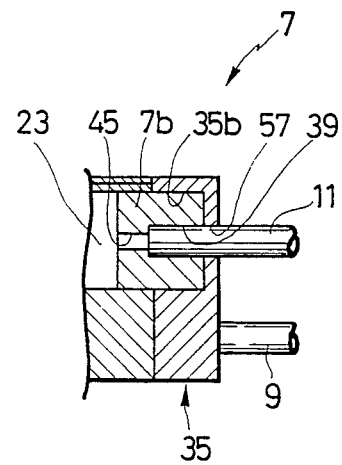

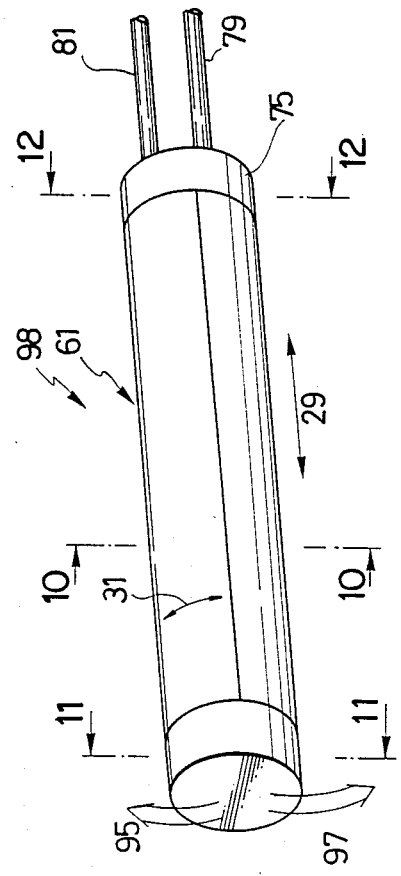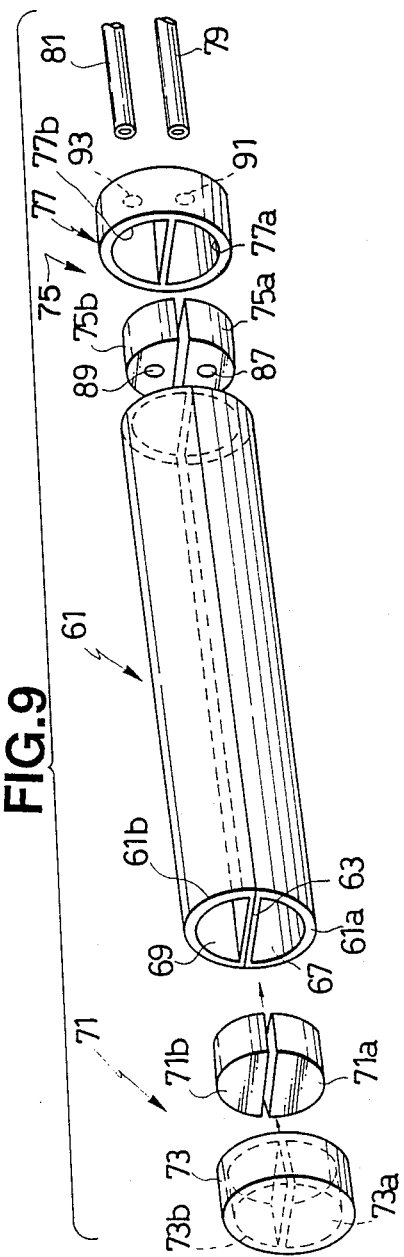

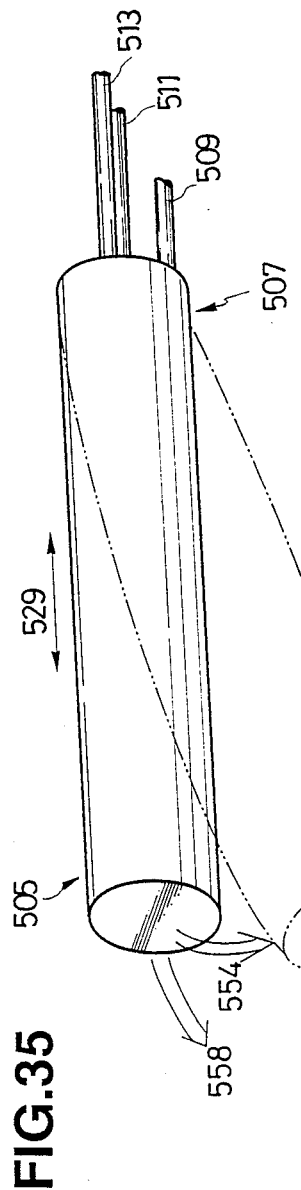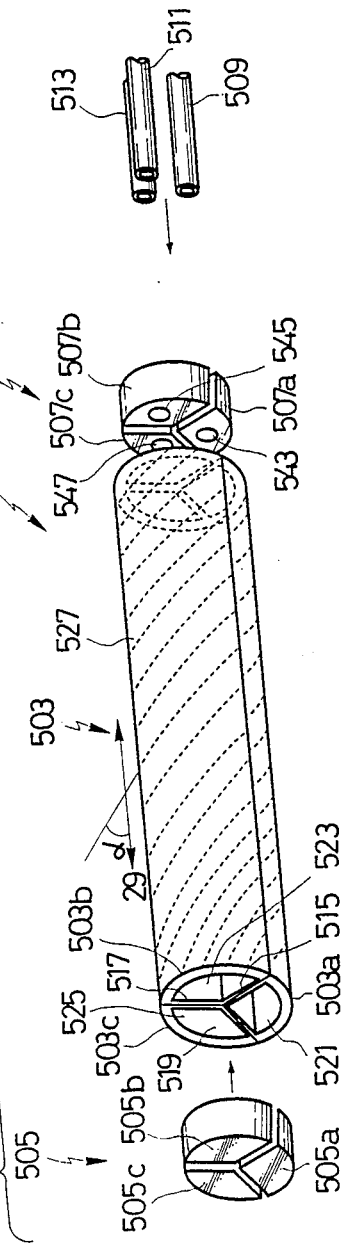
FIG.35
FIG.36

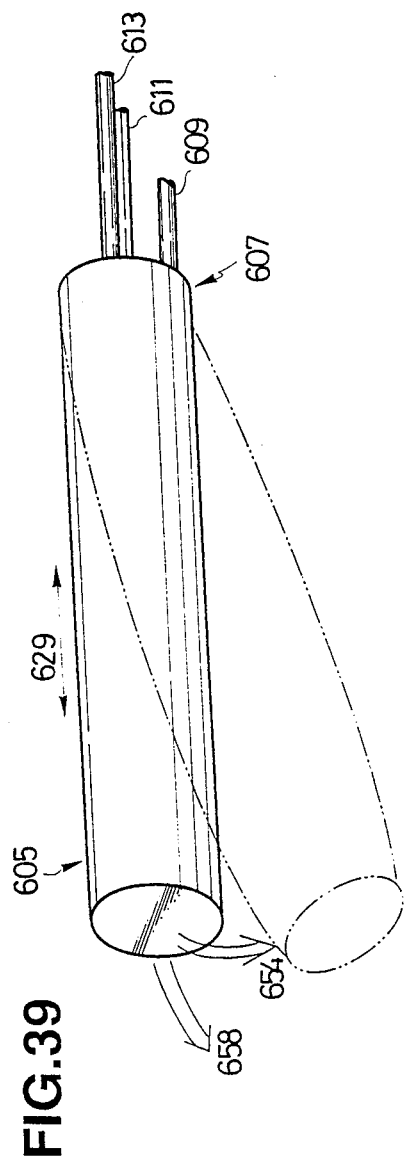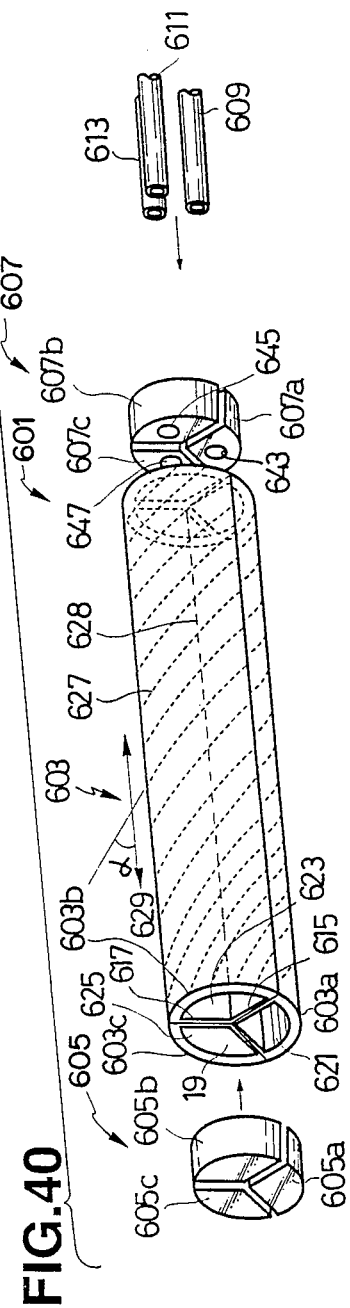
FIG.39
FIG.40

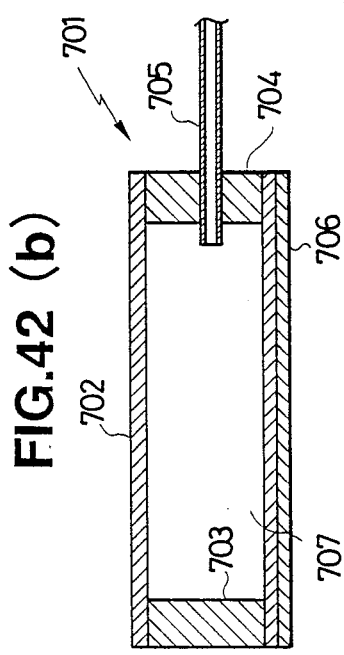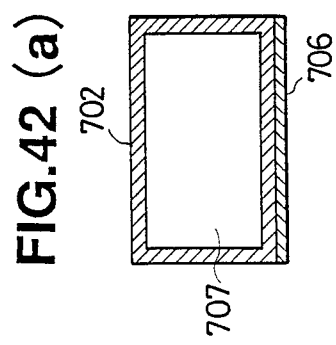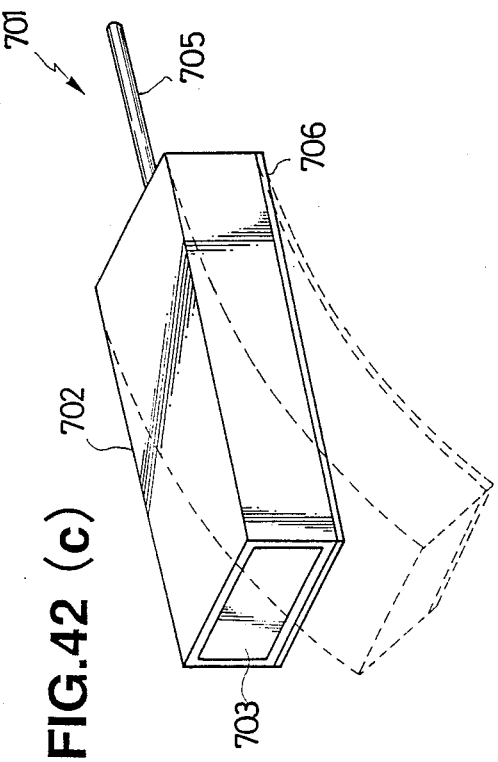
FIG.42 (a)   FIG.42 (b)   FIG.42 (c)

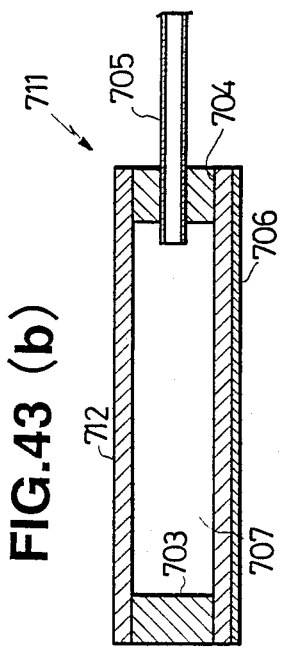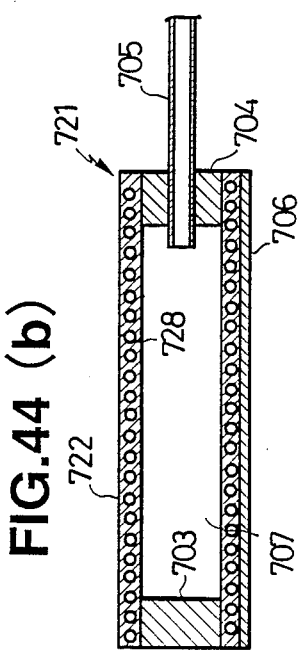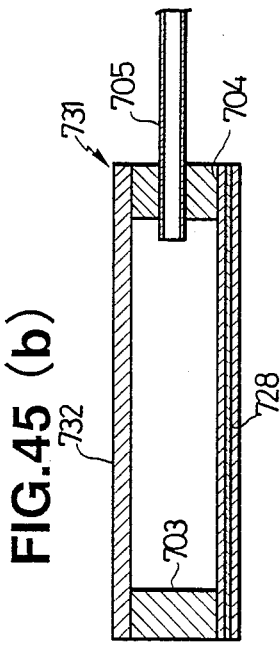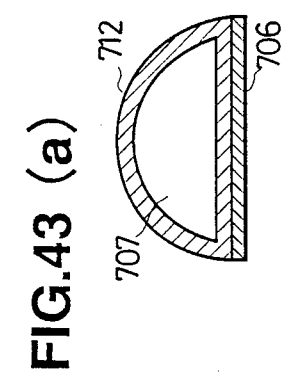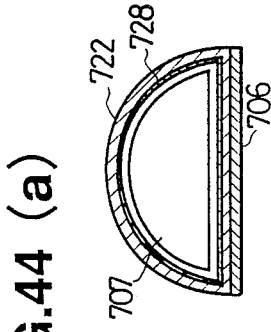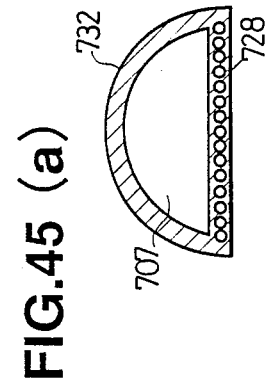

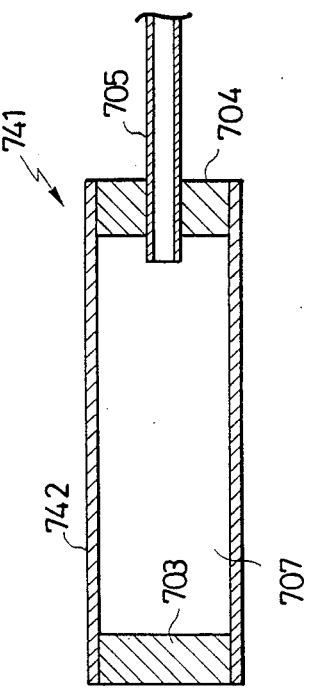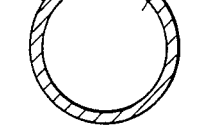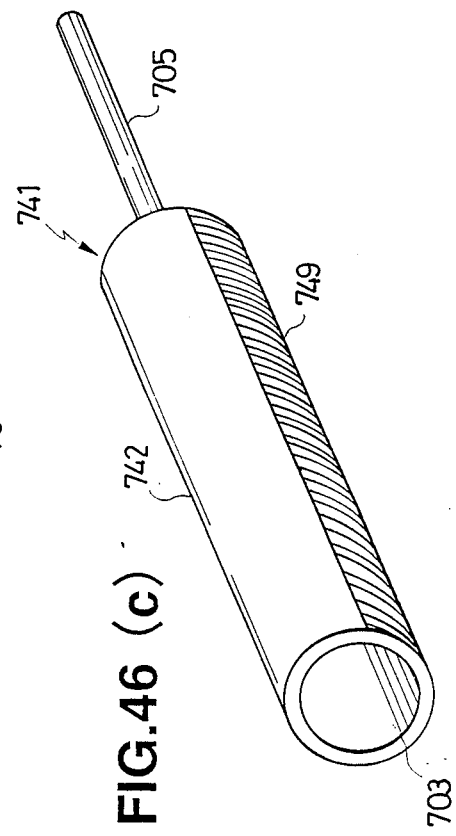
FIG.46 (a) FIG.46 (b) FIG.46 (c)

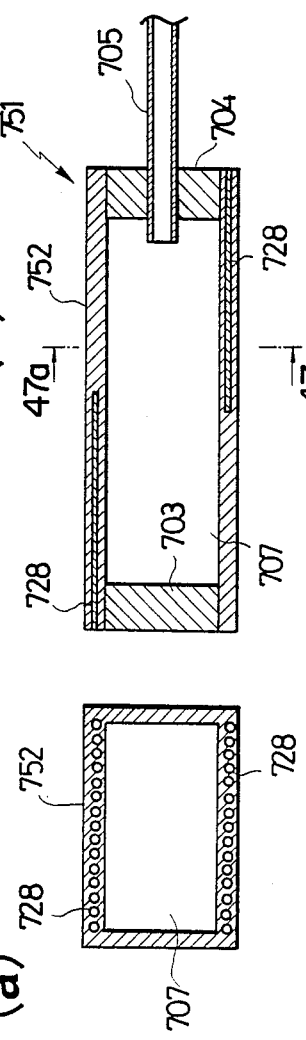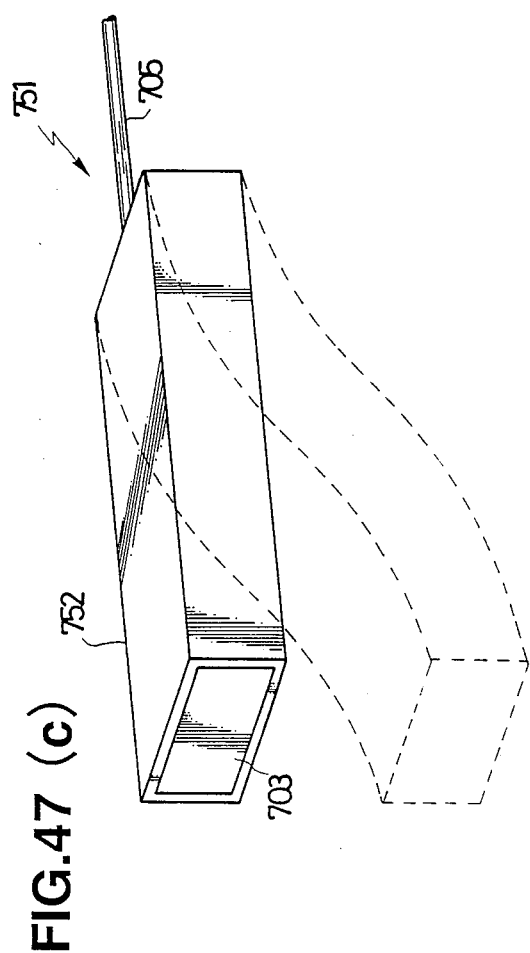
FIG.47 (a)　FIG.47 (b)　FIG.47 (c)

ELASTICALLY DEFORMABLE FLUID ACTUATOR

BACKGROUND OF THE INVENTION

1. Field of the Invention

This invention relates to an actuator movable by the energy of fluid, and more particularly to an actuator which can be reduced in diameter and can take a smooth motion at a multi-degree freedom.

2. Description of the Prior Art

Heretofore, it has been a common practice to use a hydraulic or pneumatic cylinder, a hydraulic or pneumatic motor, etc. as an actuator movable by the energy of fluid.

This conventional actuator generally has a sliding contact (e.g., between a piston and a cylinder) so that an operating fluid can easily leak out. Because of the sliding friction, smooth motions and precise positioning are difficult to achieve.

To this end, a pneumatic actuator utilizing the elastic deformation of rubber has been proposed. This prior art is exemplified by a Pneumatic Finger (trade name), German Pt. No. 2,426,086-C3 and U.S. Pat. No. 3,981,528.

As shown in FIGS. 1 and 2 of the accompanying drawings, this prior actuator comprises an elastic body 301 in the form of a rubber tube having a semicircular cross section, the elastic body 301 being provided axially partially with bellows 303c. The elastic body 301 has at one end a port 305 through which air is to be forced. Consequently when the pressure in the elastic body 301 is increased by supplying an air pressure P into the elastic body 301 from the port 305, the bellows 303 are forcibly expanded to cause the entire elastic body 301 to elastically deform to take a bending action, as indicated in phantom lines 301b in FIG. 1. At that time, by adjusting the pressure in the elastic body 301, it is possible to control a potential A, V (functions of position) of a distal end of the bent elastic body 301 and a force F acting on that distal end, as shown FIG. 1. Thus this prior actuator can take smooth motions without any leak of the acting fluid like the conventional cylinder.

However, when this known actuator is merely used to construct a slender small-sized robot arm, the bellows occupies a certain extent of space in order to take a multi-degree freedom into practice. Therefore it is possible to reduce the diameter of a robot arm by only a limited extent.

Thus the actuator utilizing the deformation of an elastic body with belows can move smoothly without any leak of the acting fluid like a cylinder. But since provision of bellows necessitate a large diameter tube, this type of actuator is not suitable for a multi-degree-freedom robot arm.

Further, when a rotating motion about the axis is to be added to the above robot arm, the actuator must be combined with a different-type actuator, with the result that the entire actuator would be more complex and hence expensive, thus making it also difficult to achieve a reduced diameter.

SUMMARY OF THE INVENTION

It is therefore an object of this invention to provide an actuator which can be reduced in diameter and can take motions smoothly at least one-degree freedom.

Another object of the invention is to provide an actuator which is simple in construction and small in size.

Still another object of the invention is to provide an actuator which can take a bending motion in an optional direction with any axial expansion.

Still another object of the invention is to provide an actuator which can take a bending motion in an optional direction as well as a rotating motion about the axis with any axial expansion.

A further object of the invention is to provide a multi-degree-freedom actuator which can produce a great force, when becoming shrunk axially, irrespective of the largeness of cross-sectional areas at opposite ends.

According to a first aspect of this invention, there is provided an actuator comprising: a tubular elastic body of which interior is separated into a plurality of pressure chambers by an axially extending partition; and means for adjusting respective pressures of the pressure chambers to render the tabular elastic body to take a motion at a multi-degree freedom. At least an outer peripheral part of the tubular elastic body has an anisotropy with respect to modulus of elasticity. A direction small in modulus of longitudinal elasticity is the axial direction of the tubular elastic body.

With this first arrangement, it is possible to deform the tubular elastic body in an optional direction at a multi-degree freedom by adjusting the pressure of an acting fluid filled in the individual pressure chamber. Partly since at least the tubular elastic body is formed from a anisotropic material, and partly since the direction small in modulus of longitudinal elasticity of this anisotropic material is the longitudinal direction of the tubular elastic body, the actuator is easy to deform in the longitudinal direction and is difficult to deform perpendicularly to the longitudinal direction. By selecting a combination of pressures of the respective pressure chambers, it is possible to select a bending direction optionally, thus enabling a multi-degree-freedom motion.

According to a second aspect of this invention, there is provided an actuator comprising: a plurality of said tubular elastic bodies each of which interior is separated into a plurality of pressure chambers by an axially extending partition; and a plurality of reinforcing members of a hardly elastically deformable quality connected alternately with the tubular elastic bodies, each of the tubular elastic bodies having a plurality of holes through which the pressures of the pressure chambers are to be transmitted between the connected tubular elastic bodies.

With this second arrangement, since an arbitrary pressure chamber is expanded and shrunk by adjusting the pressure of that optional pressure chamber, it is possible to make bending as well as expanding and shrinking motions of the entire actuator smoothly by selecting a combination of the pressures of the individual pressure chambers. Consequently a smooth multi-degree-freedom motion can be achieved, and an actuator having a simple construction can become a reality.

According to a third aspect of this invention, in an actuator comprising a tubular elastic body of which interior is separated into a plurality of pressure chambers by an axially extending partition and in which respective pressures of the pressure chambers are adjusted to render the tubular elastic body to take a multi-degree-freedom motion, a direction large in modulus of longitudinal elasticity is a direction different from an axial direction of the tubular elastic body, there being a wire extending in and through the tubular elastic body axially thereof.

With this third arrangement, partly because the actuator can take a rotation about the axis, and partly because at that time an axial extension is restricted by the wire, it is thus possible to pick out a pure rotational motion.

According to a fourth aspect of this invention, in an actuator comprising a tubular elastic body of which interior is separated into a plurality of pressure chambers by an axially extending partition and in which respective pressures of the pressure chambers are adjusted to render the tubular elastic body to take a multi-degree-freedom motion, a direction large in modulus of longitudinal elasticity is a direction different from an axial direction of the tubular elastic body, and a reinforcing direction of the tubular elastic body is a direction at an angle $\alpha$ (hereinafter called "angle of winding") less than an angle of equilibrium with respect to the generator of an outer peripheral part of the tubular elastic body.

In an actuatorin which an angle of winding $\alpha$ was 90° or slightly smaller than 90°, each pressure chamber was extended axially due to the pressurizing of the individual pressure chamber. If the tubular elastic body is reinforced in such a manner that 0° or slightly larger than 0°, the individual pressure chamber is shrunk axially when pressurized.

Such a motion of the individual pressure chamber is determined by the balance of forces creating on the tubular elastic body; when the angle of winding $\alpha$ is a certain value, the pressure chamber is kept from either extension or shrinkage even when pressurized. This value of angle of winding $\alpha$ is called "angle of equilibrium". Therefore, assuming that $0 < \alpha <$ angle of equilibrium, the individual pressure chamber becomes shrunk, rotating about the axis, when pressurized.

According to a fifth aspect of this invention, an actuator comprising a first elastic member and a second elastic member attached to the first elastic member and having a modulus of elasticity different from that of the first elastic member. The first and second elastic members are disposed parallel to each other along the axis of the actuator and is joined together so as to form a tubular body. The pressure in the tubular body is adjusted to cause the actuator to take a bending motion.

With this fifth arrangement, when the pressure in the tubular body, the tubular body takes a one-way bending motion due to the difference in modulus of elasticity between the first and second elastic members. Thus since the actuator can take a bending motion without providing bellows, it is possible to achieve an actuator which is simple in construction and easy to reduce in diameter and which can take a smooth motion.

The above and other advantages, features and additional objects of this invention will be manifest to those versed in the art upon making reference to the following detailed description and the accompanying drawings in which various structural embodiments incorporating the principles of this invention are shown by way of illustrative example.

BRIEF DESCRIPTION OF THE DRAWINGS

FIG. 3 is a general perspective view of an actuator according to a first embodiment of this invention;

FIG. 4 is an exploded perspective view of the actuator of FIG. 3;

FIG. 5 is an enlarged cross-sectional view taken along line A—A of FIG. 3;

FIG. 6 is an enlarged cross-sectional view taken along line B—B of FIG. 3;

FIG. 7 is an enlarged cross-sectional view taken along line C—C of FIG. 3;

FIG. 8 is a general perspective view of an actuator according to a modification of the first embodiment;

FIG. 9 is an exploded perspective view of the actuator of FIG. 8;

FIG. 35 is a general perspective view of an actuator according to a fifth embodiment of this invention;

FIG. 36 is an exploded perspective view of the actuator of FIG. 35;

FIGS. 39, 40 and 41 are a general perspective view, an exploded perspective view and an enlarged transverse cross-sectional view, respectively, of an actuator according to a sixth embodiment;

FIGS. 42(a), 42(b) and 42(c) are a transverse cross-sectional view, a longitudinal cross-sectional view and a perspective view, respectively, of an actuator according to a seventh embodiment of this invention, FIG. 42(c) illustrating the motion of the actuator;

FIGS. 43 through 48 show various modifications of the seventh embodiment; and

DETAILED DESCRIPTION OF THE EMBODIMENTS

Figure 1:
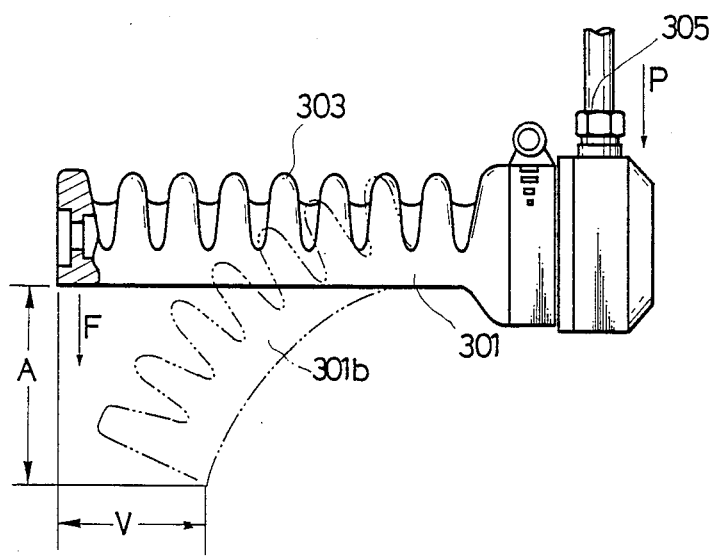
FIG. 1 is a side elevational view of a prior art actuator.
Figure 2A:
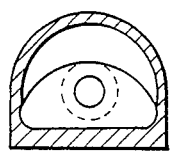
FIG. 2 shows the interior structure of the actuator of FIG. 1.
Figure 2B:
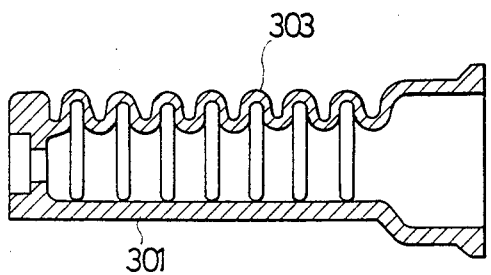
Figure 10:
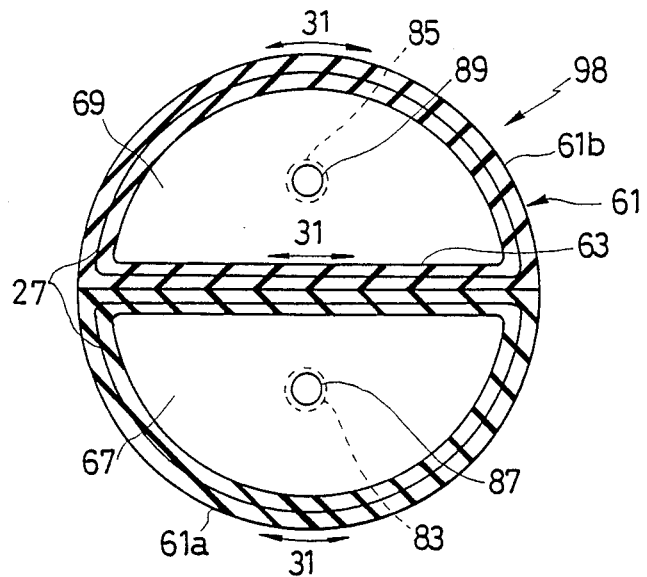
FIG. 10 is an enlarged cross-sectional view taken along line D—D of FIG. 8.

The principles of this invention are particularly useful when embodied in an actuator such as shown in FIGS. 3 and 4, generally designated by reference numeral 1.

As shown in FIG. 3, the actuator 1 generally comprises a tubular elastic body 3 defining an outer peripheral part, an upper closure 5, a lower closure 7, and pipes 9, 11, 13.

The tubular elastic body 3, as shown in FIG. 4, is composed of three identical tubular elastic members 3a, 3b, 3c disposed parallel to one another and joined together by adhesion into a unitary body. The joined part thus defines elastic partitions 15, 17, 19 extending axially of the tubular elastic body 3, and these elastic partitions 15, 17, 19 divide the tubular elastic body 3 into three axial pressure chambers 21, 23, 25. Each of the tubular elastic members 3a, 3b, 3c, as shown in FIG. 5, includes Aramid fibers (trade name) 27 wound around the axis spirally with fine inter-fiber spaces, and a silicone rubber coated over the fibers. By forming the tubular elastic body 3 from an anisotropic material combined of the fibers 27 and the rubber, a direction small in modulus of longitudinal elasticity is substantially aligned with the axial direction 29 of the tubular elastic body 3, and the tubular elastic body 3 is easily extendible in the axial direction 29. But in a direction 31 perpendicular to the axial direction 29, the tubular elastic body 3 is hardly extendible because it is large in modulus of elasticity due to the fibers 27. Here the fibers should by no means be limited to Aramid and may be nylon or cotton.

The upper closure 5 includes three fan-shaped upper closure members 5a, 5b, 5c sealing the respective pressure chambers 21, 23, 35 defined by the tubular elastic members 3a, 3b, 3c, and an upper cover member 33 covering over all the upper closure members 5a, 5b, 5c after one end of the individual upper closure members 5a, 5b, 5c has been inserted in the respective tubular elastic members 3a, 3b, 3c and joined thereto. The attaching of the upper closure 5 is such as shown in FIG. 4. The upper cover member 33 is in the form of a tube of semicircular cross section and has inside three recesses 33a, 33b, 33c in which the respective upper closure members 5a, 5b, 5c are to be fitted. The outside shape or contour of this upper cover member 33 is identical with that of the tubular elastic body 3.

Likewise, the lower closure 7 includes three fan-shaped lower closure members 7a, 7b, 7c, and a lower cover member 35 covering all the lower closure members 7a, 7b, 7c after one end of the individual lower closure member 7a, 7b, 7c has been inserted in the respective tubular elastic member 3a, 3b, 3c and joined thereto The lower closure members 7a, 7b, 7c, as shown in FIG. 7, have three insertion holes 37, 39, 41 in which the respective pipes 9, 11, 13 are to be inserted. The lower closure members 7a, 7b, 7c also have three communication holes 43, 45, 47, respectively, contiguous to the respective insertion holes 37, 39, 41 for communication between the respective tubes 9, 11, 13 and the corresponding pressure chambers 21 23 25 The pipes 9, 11, 13 are sealingly joined to the respective insertion holes 37, 39, 41 by an adhesive. The lower cover member 35 is identical in outside shape with the upper cover member 33 and has three recesses 35a, 35b, 35c in which the respective lower closure members 7a, 7b, 7c are to be fitted. The lower closure members 7a, 7b, 7c have three insertion holes 55, 57, 59, respectively, which communicate with the respective recesses 35a, 35b, 35c and in which three insertion holes 55, 57, 59. Consequently, the pressures of the individual pressure chambers 21, 23, 25 can be respectively controlled by supplying to the respective pressure chambers 21, 23, 25 the operating fluid as adjusted by a pressure control apparatus (not shown) located outside.

The operation of the actuator 1 will now be described. Here assuming that the operating fluid is supplied from the pipe 9 to the pressure chamber 21 to increase the pressure in it, this pressure chamber 21 becomes extended in the axial direction 29, thus causing the tubular elastic body 3 to bend in the direction 54 to assume a posture indicted by phantom lines 56. In this state, as the pressure in the pressure chamber 23 is increased via the pipe 11, then the tubular elastic body 3 takes a bend in the direction 58. Thus by selecting a combination of the pressures of the three pressure chambers 21, 23, 25, it is possible to make a bending motion of the tubular elastic body 3 in an optional direction. At that time the pressures in the individual pressure chambers 21, 23, 25 are controlled with fine adjustment by a non-illustrated pressure control apparatus. If these three pressure chambers 21, 23, 25 are equally pressurized, the tubular elastic body 3 can be extended straightly along its axis. By thus controlling the pressures of the three pressure chambers 21, 23, 25 with utilizing the characteristic of an anisotropic elastic material, it is possible to locate the distal end of the actuator 1 in an optional point set within the range of movement.

With the actuator thus constructed, since it is free from any leak of the operating fluid and any sliding contact between the component parts, it is possible to achieve a smooth motion and a fine positioning without difficulty. Further, this actuator is simple in construction and can be reduced in diameter with ease. By measuring the volume and pressure of an operating fluid having been supplied, the operator can learn about the posture of the actuator and the acting force; that is, it is possible to control the posture and the acting force without equipping a sensor on the distal end of the actuator. The resultant actuator is very large in ratio of output/weight.

FIGS. 8 through 12 illustrate a modification of the first embodiment, in which the parts similar to those of the first embodiment are designated by like reference numerals.

In the modification, like the first embodiment, a tubular elastic body 61 is formed from an anisotropic elastic material which is easily extendible in the axial direction 29 and is hardly extendible in the direction 31 perpendicularly to the axial direction 29. This tubular elastic body 61 is composed of two identical tubular elastic members 61a, 61b extending axially of and parallel to each other and joined together by adhesion into a unitary body. This joined part constitutes an elastic partition 63 extending parallel to the axis of the tubular elastic body 61 and dividing the interior of the tubular elastic body 61 into a pair of pressure chambers 67, pair of pressure chambers 67, 69.

Figure 11:
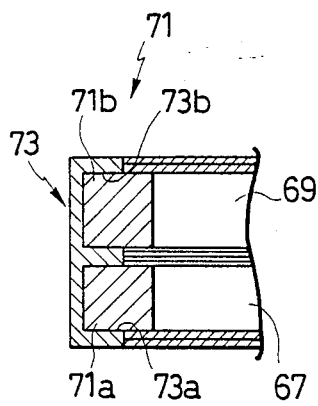
FIG. 11 is an enlarged cross-sectional view taken along line E—E of FIG. 8.

An upper closure 71 includes two upper tubular upper closure members 71a, 71b, 71c sealing the respective pressure chambers 67, 69, and an upper cover member 73 covering over these two upper closure members 71a, 71b. The attaching of the upper closure 71 is such as shown in FIG. 11. The upper cover member 73 is in the form of tube of semicircular cross section and has inside two recesses 73a, 73b are to be fitted.

Likewise, a lower closure 75 includes two lower closure members 75a, 75b each in the form of a semi-circular tube, and a lower cover member 75 covering these two lower closure members 75a, 75b after one end of the individual lower closure member 75a, 75b has been inserted in the respective tubular elastic member 61a, 61b and sealingly joined thereto.

Figure 12:
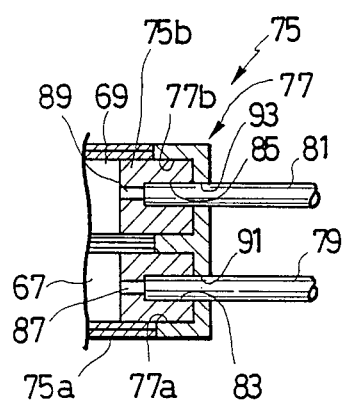
FIG. 12 is an enlarged cross-sectional view taken along line F—F of FIG. 8.
Figure 13:
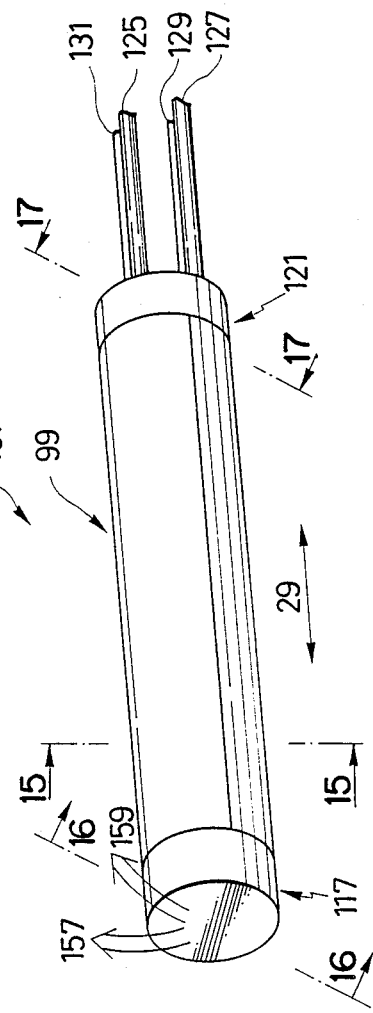
FIG. 13 is a general perspective view of an actuator according to another modification of the first embodiment.
Figure 14:
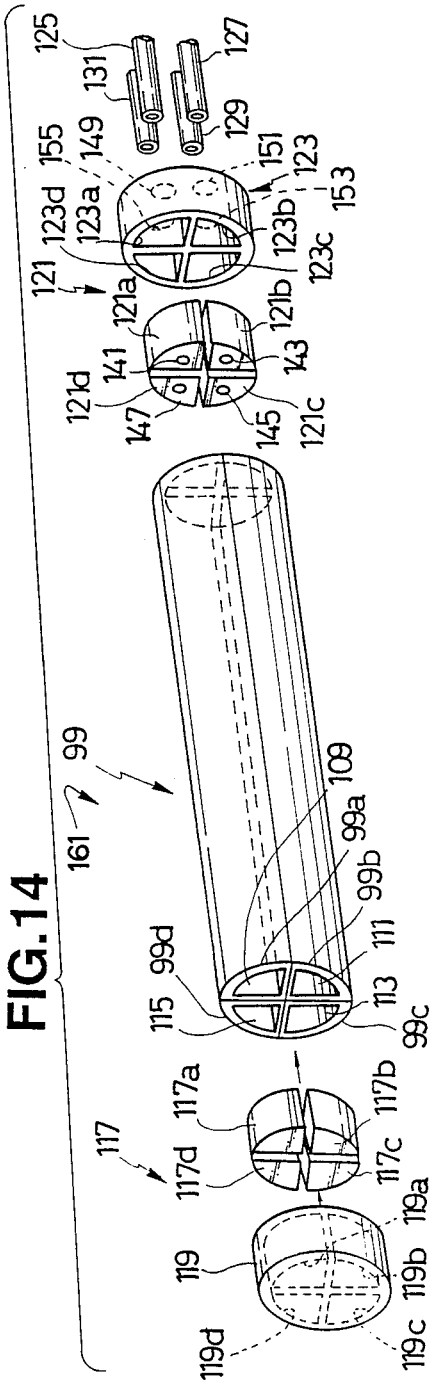
FIG. 14 is an exploded perspective view of the actuator of FIG. 13.
Figure 15:
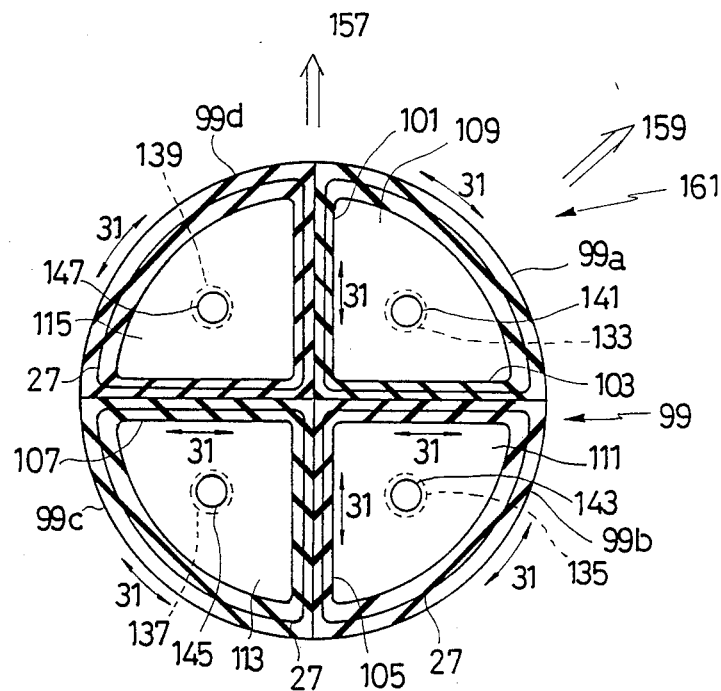
FIG. 15 is an enlarged cross-sectional view taken along line G—G of FIG. 13.

The lower closure members 75a, 75b, as shown in FIG. 12, have two insertion hole 83, 85 in which the respective pipe 79, 81 is to be inserted. The lower closure members 75a, 75b also have three communication holes 87, 89, respectively, contiguous to the respective insertion holes 83, 85 for communication between the respective pipes 79, 81 and the corresponding pressure chambers 67, 69.

The lower cover member 77 has two recesses 77a, 77b in which the respective lower closure members 75a, 75b are to be fitted. The lower cover member 77 has two insertion holes 91, 93 which communicate with the respective recesses 77a, 77b and in which the respective pipes 79, 81 are inserted. Consequently, the pressures of the individual pressure chambers 67, 69 can be respectively controlled by supplying the respective pressure chambers 67, 69 the operating fluid as adjusted by a pressure control apparatus (not shown) located outside.

The operation of the actuator 98 will now be described. Here assuming that the operating fluid is supplied from the pipe 79 to the pressure chamber 67 to increase the pressure in it, this pressure chamber 67 becomes extended in the axial direction. 29, thus causing the tubular elastic body 61 to bend in the direction 95.

On the other hand, if the operating fluid is supplied from the pipe 81 to the pressure chamber 69 to increase the pressure in it, then this pressure chamber 69 becomes extended in the direction 97. In order to cause the actuator 98 to take an elongating or shrinking motion in the axial direction 29, the two pressure chambers 67, 69 are equally pressurized under the control of a non-illustrated pressure control apparatus. Consequently, by supplying to the two pressure chambers 67, 69 via the respective pipes 79, 81 the operating fluid as adjusted, it is possible to cause the actuator 98 to take an elongating or shrinking motion in the axial direction 29 and a bending motion in the directions 95, 97 perpendicular to the elastic partition 63.

FIGS. 13 through 17 illustrate another modification of the first embodiment, in which the parts similar to those of the first embodiment are designated by like reference numerals.

In this modified actuator 161, like the first embodiment, a tubular elastic body 99 is formed from an anisotropic elastic material which is easily extendible in the axial direction 29 and is hardly extendible in the direction 31 perpendicular to the axial direction 29. This tubular elastic body 99 is composed of four identical tubular elastic members 99a, 99b, 99c, 99d extending along and parallel to the axis of the tubular elastic body 99 and joined together by adhesion into a unitary body. The joined parts constitute four elastic partitions 101, 103, 105, 107 extending parallel to the axis of the tubular elastic body 99 and dividing the interior of the tubular elastic body 99 into four pressure chambers 109, 111, 113, 115.

Figure 16:
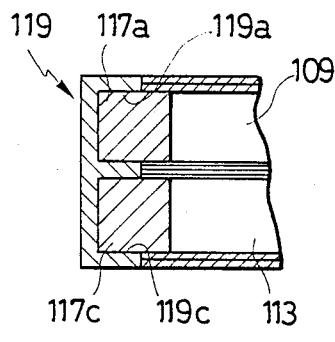
FIG. 16 is an enlarged cross-sectional view taken along line H—H of FIG. 13.

An upper closure 117 includes four upper tubular upper closure members 117a, 117b, 117c 117d of metal sealing the respective pressure chambers 109, 111, 113, 115, and an upper cover member 119 covering over these four upper closure members 117a, 117b, 117c, 117d. The attaching of the upper closure 117 is such as shown in FIG. 16. The upper cover member 119 is in the form of a tube of semicircular cross section and has inside four recesses 119a, 119b, 119c, 119d are to be fitted.

Likewise, a lower closure 121 includes four lower closure members 121a, 121b, 121c, 121d each in the form of semicircular tube, and a lower cover member 123 covering these four lower closure members 121a, 121b, 121c, 121d after one end of the individual lower closure member 121a, 121b, 121c, 121d has been inserted in the respective tubular elastic member 99a, 99b, 99c, 99d and sealingly joined thereto.

Figure 17:
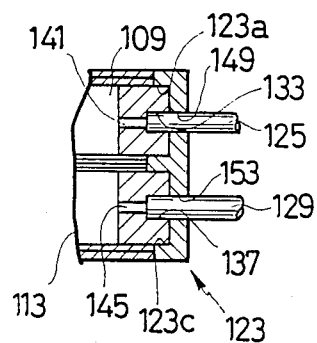
FIG. 17 is an enlarged cross-sectional view taken along line I—I of FIG. 13.

The lower closure members 121a, 121b, 121c, 121d, as shown in FIG. 17, have four insertion hole 133, 135, 137, 139 in which the respective pipes 125, 127, 129, 131 are to be inserted. The lower closure members 121a, 121b, 121c, 121d also have four communication holes 141, 143, 145, 147, respectively, contiguous to the respective insertion holes 133, 135, 137, 139 for communication between the respective pipes 125, 127, 129, 131 and the corresponding pressure chambers 109, 111, 113, 115.

The lower cover member 123 has four recesses 123a, 123b, 123c, 123d in which the respective lower closure members 121a, 121b, 121c, 121d are to be fitted. The lower cover member 123 has four insertion holes 149, 151, 153, 155 which communicate with the respective recesses 123a, 123b, 123c, 123d and in which the respective pipes 125, 127, 129, 131 are inserted.

The operation of the actuator 98 will now be described. Here assuming that the operating fluid is supplied from the pipes 127, 129 to the pressure chambers 111, 113 to increase the pressures in them, these pressure chambers 111, 113 become extended in the axial direction 29, thus causing the tubular elastic body 99 to bend in the direction 157 in FIG. 13.

In order to cause the actuator 161 to take an elongating or shrinking motion in the axial direction 29, the four pressure chambers 109, 111, 113, 115 are equally pressurized under the control of a non-illustrated pressure control apparatus. To achieve a bending motion in the direction 159, the pressures of the pressure chambers 111, 113, 115 are increased. Consequently, by supplying to the four pressure chambers 109, 111, 113, 115 via the respective pipes 125, 127, 129, 131 the operating fluid as adjusted, it is possible to cause the actuator 161 to take a multi-degree-freedom motion.

Figure 18:
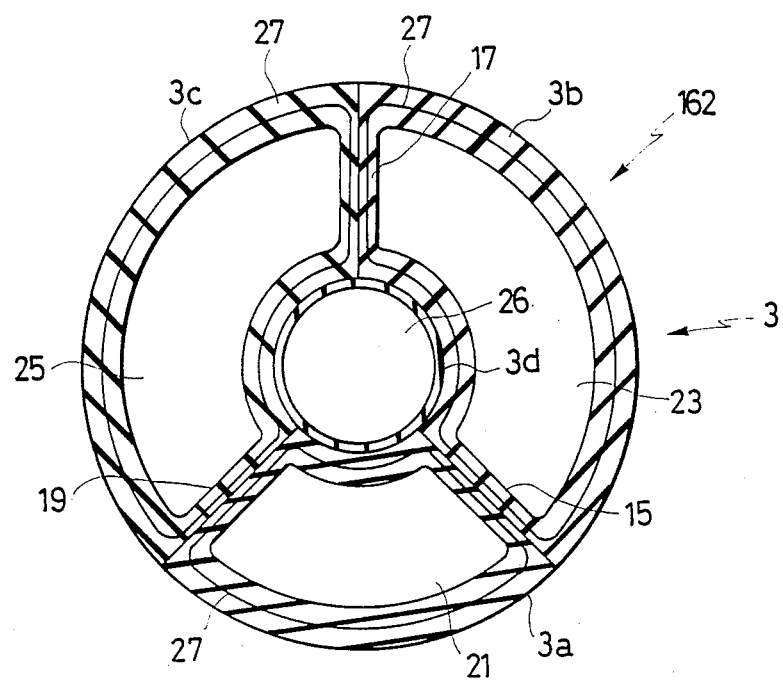
FIG. 18 is an enlarged cross-sectional view of an actuator according to still another modification of the first embodiment.

In still another modification of the first embodiment, as shown in FIG. 18, the modified actuator 162 may have a through hollow portion 26 in which pressure is not to be controlled. Apart from this through hollow portion 26, the modified actuator 162 is identical in construction with the first embodiment; therefore its detailed description has been omitted here for clarity, with similar parts being only designated by like reference numerals. The through hollow portion 26, like the other pressure chambers 21, 23, 25, is defined by an additional tubular elastic member 3d extending along and parallel to the axis and joined with the other tubular elastic members 3a, 3b, 3c by adhesion.

With this actuator 162, though there is a space in which pressure is not adjusted, a uniform degree of freedom can be secured in all directions, and hence a stable motion of the actuator 162 can be realized. Further, if many pipes or wires are threaded through the through hollow portion 26, those contents are protected against the external force as the pressures of the pressure chambers 21, 23, 25 around perform a cushion role, thus eliminating the fear of breaking or damaging the contents. Alternatively, there may be two or more spaces, such as the through hollow portion 26, in which pressures are not to be adjusted; one space for insertion of the contents, and the other for passage of fluid. Of course, pressure may be used in forcing the fluid to flow in the actuator from one end to the other end. The cover member may have a hollow corresponding to the through hollow portion 26.

Figure 19:
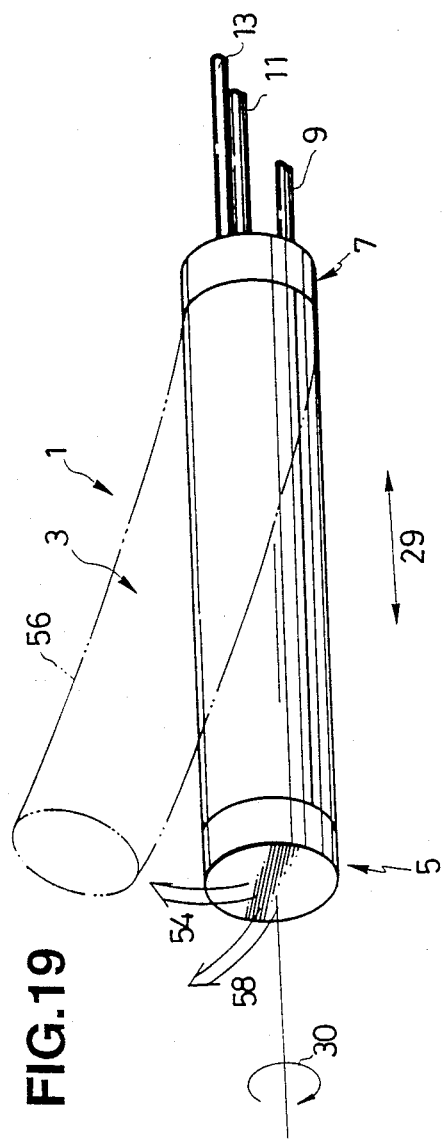
FIG. 19 is a general perspective view of an actuator according to a second embodiment of this invention.
Figure 20:
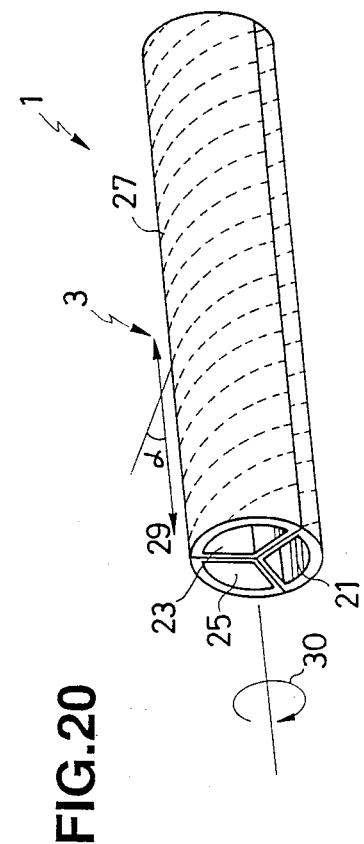
FIG. 20 is a perspective view showing the direction of fibers of the actuator of FIG. 19.

In the foregoing embodiments, the fiber is wound in such a manner that the axis of the tubular elastic body is at substantially a right angle with respect to the longitudinal direction of the fiber. But this invention should by no means be limited to this way of winding. Namely, it is not mandatory that an angle $\alpha$ (hereinafter called "angle of winding") formed by the axial direction of the tubular elastic body and the longitudinal direction of the fiber is 90°. This second embodiment will now be described with reference to FIGS. 19 and 20, in which the parts similar to those of the first embodiment are designated by like reference numerals or omitted.

In the tubular elastic body 3, the fibers 27 are wound spirally around the individual tubular elastic body 3a, 3b, 3c at the same winding angle $\alpha$ ($\neq$90°) and are coated with rubber as an elastic material. Since the pitch of the fibers 27 progressively increases as (90°$-\alpha$) becomes larger, it is preferred to wind a plurality of fibers round the individual tubular elastic member so as to prevent the inter-fiber distance from spreading. Because the tubular elastic body 3 is formed by an anisotropic elastic material combined of the fibers 27 at the winding angle $\alpha$ and the rubber, the tubular elastic body 3 is hardly extendible in the direction inclined at an angle $\alpha$ and is easily extendible in the direction inclined at an angle of ($\alpha+90°$).

Figure 29:
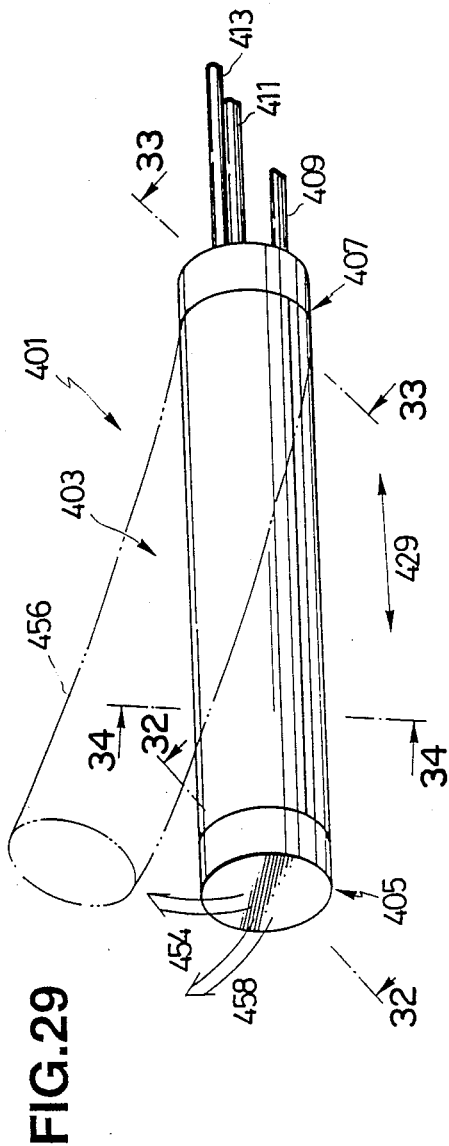
FIG. 29 is a general perspective view of an actuator according to a fourth embodiment of this invention.

The operation of the actuator 1 will now be described. Here assuming that the operating fluid is supplied from the pipe 9 to the pressure chamber 21 to increase the pressure in it, this pressure chamber 21 becomes extended in the axial direction 29, thus causing the tubular elastic body 3 to bend in the direction 54 to assume aposture indicated by phantom lines 56, as shown in FIG. 29. At that time, since this bending motion of the tubular elastic body 3 is accompanied by a twist motion in the direction 30, the entire actuator 1 creates a rotating motion about its axis. Likewise, as the pressures of the two pressure chambers 21, 23 are increased concurrently, the tubular elastic body 3 takes a bending motion in the direction 58 with rotating about the axis. Further, as the pressures of the three pressure chambers 21, 23, 25 are increased equally, the tubular elastic body 3 takes an elongating motion in the axial direction and also a rotating motion about the axis. The pressures of the pressure chambers may be controlled by a non-illustrated pressure control apparatus.

Thus by controlling the pressures of the three pressure chambers 21, 23, .25 with utilizing the characteristic of an anisotropic elastic material, it is possible to cause the actuator 1 to take a bending motion in an optional direction and an elongating motion in the axial direction, with rotating about the axis.

The number of the pressure chambers may be two, three, four or any else, which can be selected at option to meet with the purpose. If the tubular elastic body 3 has no elastic partition, that is, if the actuator has only a single pressure chamber, the actuator can take only an elongating motion in the axial direction and a rotating motion. With the pressure chambers kept in neutral as pressurized, if the pressure is reduced, a rotating motion in a direction opposite to the direction 30 can be obtained.

The proportion of amounts of movements between the rotating motion and the bending and the axialling elongating motions can be determined on the basis of the winding angle $\alpha$; therefore, by varying this angle $\alpha$, it is possible to design a desired actuator which can take a different motion. Further, if the winding angle $\alpha$ is varied in a single actuator, this actuator can move at an increased degree of freedom.

In production, spirally wound fibers are coated with rubber as an elastic material to form a single tubular elastic member. A plurality of such tubular elastic members are arranged parallel to the axial direction and joined together by adhesion to provide a tubular elastic body and thus an actuator. The outside shape or contour of an actuator may be formed by extrusion molding, using a core having a cross-sectional shape substantially similar to that of a prospective pressure chamber. Alternatively, after the outer shape or contour of a tubular elastic body blank has been formed, a fiber or fibers may be wound round the tubular elastic body blank, or instead of the winding of fibers, a plurality of annular fibrous members may be mounted on the tubular elastic body blank. According to the former method, it is possible to prevent the tubular elastic members from separating at their joined part due to the difference in pressure between the pressure chambers so that the actuator can be bent to an increased extent. According to the latter method, any separation between fibers and rubber as well as any radial expansion of the tubular elastic body can be prevented, thus guaranteeing an improved actuator which is deformable to a large extent in a required direction with respect to a given pressure. In either method, since the thickness of the actuator can be reduced, it is possible to minimize the diameter of the actuator.

Figure 21:
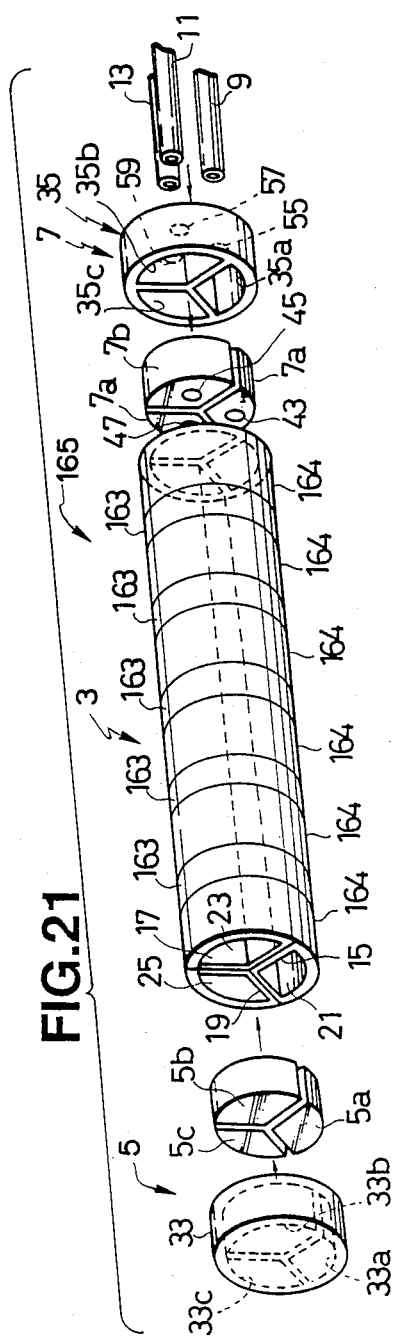
FIG. 21 is an exploded perspective view of an actuator according to a third embodiment of this invention.
Figure 22:
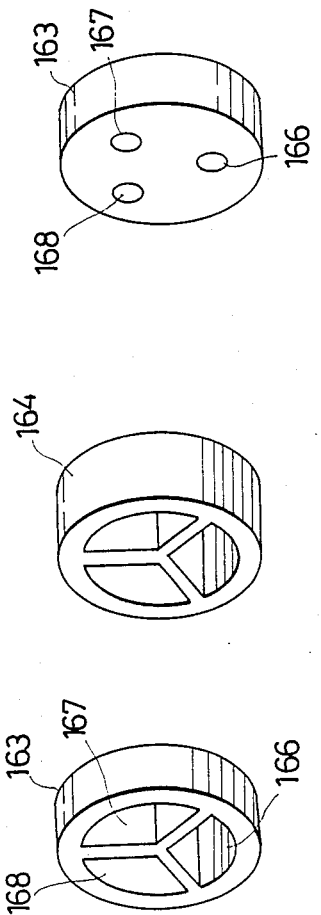
FIGS. 22(a), 22(b) and 22(c) are perspective views of members constituting an elastic body of the actuator of FIG. 21.

FIG. 21 illustrates an actuator 165 according to a third embodiment of this invention. In this third embodiment, as shown in FIGS. 22(a) and 22(b), an actuator 165 is composed of a plurality of reinforcing members 163 such as of metal or engineering plastics, and a plurality of elastic members 164 such as of rubber, which are alternately arranged along the axis and tightly joined together. In the illustrated embodiment, the reinforcing members 163 are manufactured by cutting a wire into slices and then treating the wire slices with a discharge process, or by (punching a metal sheet), while the elastic members 164 are manufactured by extrusion molding. The configuration of pressure chambers 21, 23, 25, formed by joining the reinforcing members 163 and the elastic members 164 together, is identical with that of the first embodiment. During this joining, these reinforcing and elastic members 163, 164 may be individually displaced angularly about the axis. By arranging the members with angular displacement it is possible to form the pressure chambers in a desired shape so that the resultant actuator can take a complex or composite motion. To provide a sealing so as to avoid any leak of fluid between the adjacent pressure chambers, three holes 166, 167, 168 of the individual reinforcing member 163 may be reduced in size, as shown in FIG. 22(c). With this construction, because of the reinforcing members 163, the actuator is durable against any external impact or pressure. Further, if the thickness of the individual reinforcing member 163 is smaller than that of the individual elastic member 164, it is possible to widen the range of movement of the actuator.

Figure 23:
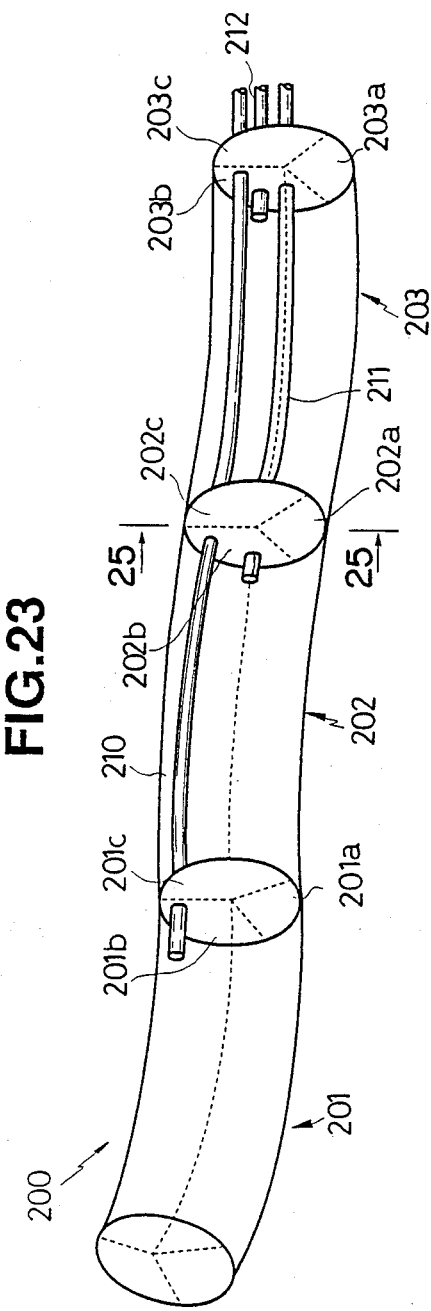
FIG. 23 is a see-through perspective view showing a practical example of a composite actuator in which a plurality of actuators of this invention are connected end to end.

FIG. 23 illustrates a composite actuator 200 which includes three actuators connected in series end to end, each having the above-described construction of the first embodiment. Each of the three actuators 201, 202, 203 has three pressure chambers 201a, 201b, 201c; 202a, 202b, 202c; 203a, 203b, 203c communicating with the respective pipes so that their interior pressures can be adjusted independently of one another. In FIG. 23, only the pipes 210, 211, 212 for adjusting the pressures in the respective pressure chambers 201b, 202b, 203b are illustrated for clarity; the similar pipes are connected also with the other pressure chambers. Here only the three pressure chambers 201b, 202b, 203b and the three corresponding pipes 210, 211, 212 will be described for clarity, but the remaining pressure chambers and pipes are identical in construction with the described chambers and pipes.

The pipe 210 for adjusting the pressure in the pressure chamber 201b extends in and through the pressure chambers 202b, 203b and leads to a non-illustrated pressure control apparatus via a base (right in FIG. 23) of the composite actuator 200. Because the pipe 210 extends through only the chambers 202b, 203b so as not to allow fluid communication between the individual pressure chamber 202b, 203b and the pipe 210, the pressures in the pressure chambers 202b, 203b are not susceptible to the pressure in the pipe 210.

Likewise, the pipe 211 for adjusting the pressure in the pressure chamber 202b extends in and through the pressure chamber 203b of the actuator 203 and leads to the non-illustrated pressure control apparatus via the base of the composite actuator 200. The pipe 212 for adjusting the pressure in the pressure chamber 203b leads to the pressure control apparatus directly via the base of the composite actuator 200. Yet, since there is not allowed fluid communication between the pressure chamber 203b is not susceptible to the pressure in the pipe 211.

Further, as shown in FIG. 23, the pipes extending through the other actuators should leave room in the pressure chambers so as not to hinder the motion of the actuators. Usually, there may be left room only enough to allow the pipes to flex within the pressure chambers. Alternatively, it is effective that the pipes are threaded through the pressure chambers after having been shaped into a spiral shape. In any case, it is preferred to determine the entire length of the individual pipe with thinking over the prospective amount of deformation of the entire composite actuator 200.

With this construction, since the total nine pipes for adjusting the pressures in the corresponding nine pressure chambers extend from the base of the composite actuator 200, it is possible to utilize this composite actuator 200, without any modification, as a manipulator. Besides, since the pipe for driving the forward-end actuator is accommodated in the base-side actuator, there is no bulge or projection outside the composite actuator 200 so that the composite actuator 200 can be reduced in diameter, thus giving a very neat appearance.

Figure 25:
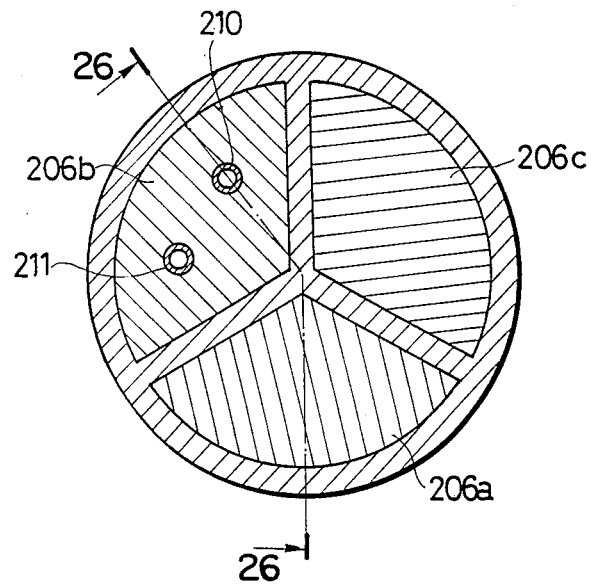
FIG. 25 is an enlarged cross-sectional view taken along line J—J of FIG. 23.
Figure 26:
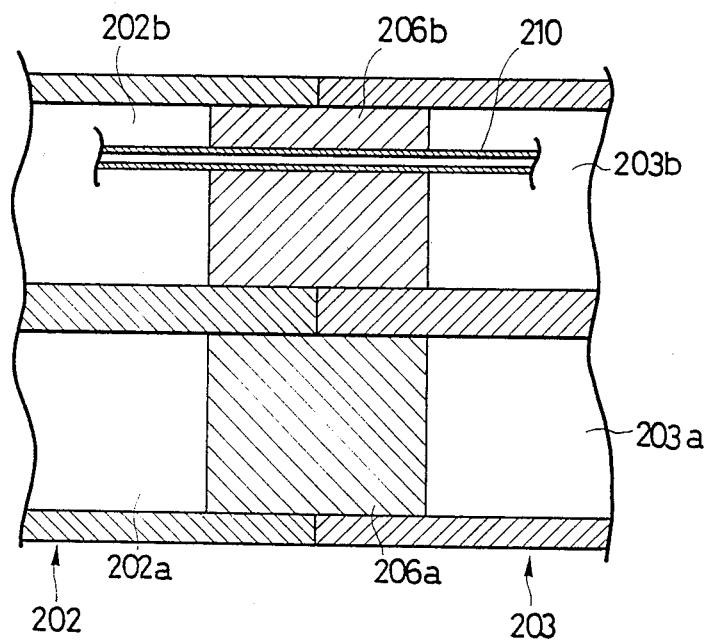
FIG. 26 is an enlarged cross-sectional view taken along line K—K of FIG. 25.

FIGS. 25 and 26 illustrate one example of joining between the two actuators 202, 203. This joining is accomplished by three joining metal fittings 206a, 206b, 206c fixedly fitted in the respective three pairs of adjacent pressure chambers 202a, 203a; 202b, 203b; 202c, 203c of the actuators 202, 203. Each of the joining metal fittings 206a, 206b, 206c has a shape similar to the cross-sectional shape of the individual pressure chamber. In this composite actuator 200, the pressure chambers of the actuators 202, 203 are identical in shape; if they are different in shape, the joining metal fittings must be of stepped type. Each of the metal fittings 206a, 206b, 206c has two holes in which the pipes (for example, the pipes 210, 211 in the case of the metal fittings 206b) driving the actuators 201, 202 are inserted and fixed. Consequently, since the joining metal fittings and the pipes and the actuators are perfectly joined together by adhesion, it is possible to avoid any leak of fluid between the pressure chambers of the actuators 202, 203.

Although three actuators of the identical configuration are used in the illustrated example, the number of the actuators may be any else, which necessitates nothing except changing the number of the pipes. Further, the actuators may have different degrees of freedom; that is, a three-chamber three-degree-freedom actuator may be combined with a two-chamber two-degree-freedom actuator or a one-chamber one-degree-freedom actuator.

Figure 24:
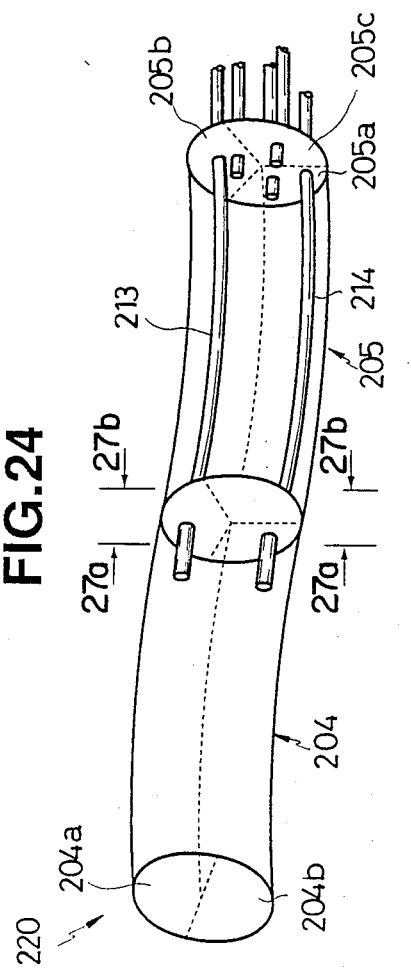
FIG. 24 is a view similar to FIG. 23, showing another practical example of the composite actuator.

FIG. 24 illustrates another composite actuator 220 in which a two-degree-freedom actuator 204 and a three-degree-freedom actuator 205 are connected to each other. The three-degree freedom actuator 205 has three pressure chambers 205a, 205b, 205c and is capable of taking a bending motion in a desired direction and an elongating motion in the axial direction. The two-degree-freedom actuator 204 has two pressure chambers 204a, 204b and is capable of taking a bending motion in a direction perpendicular to the inter-chamber partition and an elongating motion in the axial direction. A pair of pipes 213, 214 for adjusting the pressures in the pressure chambers 204a, 204b extend in and through the pressure chambers 205a, 205b of the actuator 205 and leads to the non-illustrated pressure control apparatus via a base (right in FIG. 24) of the composite actuator 220.

Figure 27:
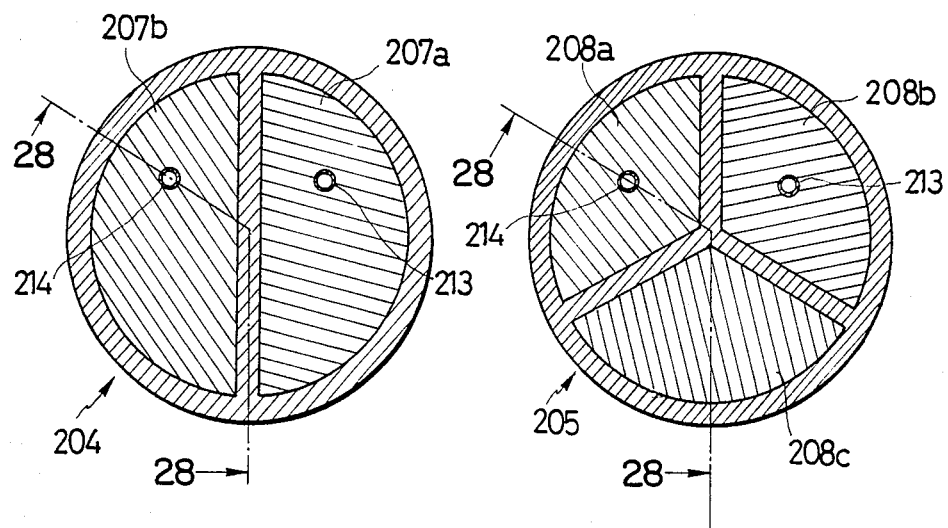
FIGS. 27(a) and 27(b) are enlarged cross-sectional views taken along lines L—L and M—M, respectively, of FIG. 24.
Figure 28:
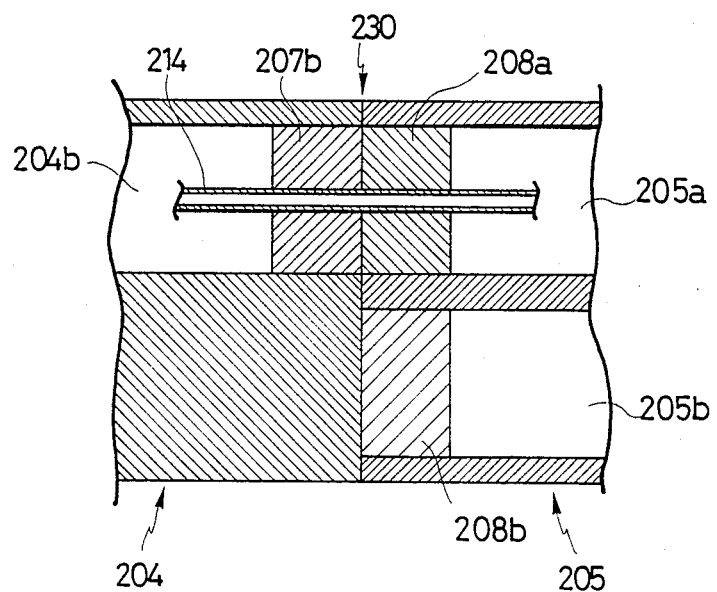
FIG. 28 is a cross-sectional view taken along line N—N of FIGS. 27(a) and 27(b)

FIGS. 27(a), 27(b) and 28 illustrate one example of the joining between the two actuators 204, 205. This joining is accomplished by five joining metal fittings 207a, 207b, 208a, 208b, 208c fixedly fitted in the pressure chambers 204a, 204b, 205a, 205b, 205c, respectively, of the actuators 204, 205. Apart from the metal fittings 208c, the other four metal fittings 207a, 207b, 208a, 208b have communication holes locatable so as to be aligned with one another when the two actuators 204, 205 are put together at the joint surfaces 230. The pipes 213, 214 extends through these communication holes and are fixed to the respective metal fittings. Besides, the two actuators 204, 205 are fixed to each other by the metal fittings and at the elastic partition by adhesion.

Though including the actuators of different structures, this composite actuator can take a motion without impairing the degree of freedom of the individual actuators. Also the composite actuator 220 can be reduced in diameter, thus giving a very neat appearance.

With this construction, since actuators of desired types may be connected to obtain a desired degree of freedom depending on the purpose, this composite actuator 220 can be utilized as a robot arm or manipulator which generally requires a multi-degree freedom. Further, because the composite actuator can be reduced in diameter and has no bulges or recesses on the peripheral surface, it can also be applied to endoscopes for industrial and medial use.

This invention should by no means be limited to the foregoing specific forms. For example, although both the tubular elastic body and the elastic partition are formed of an anisotropic elastic material, only the tubular elastic body may be formed of an anisotropic elastic material; that is, the elastic partition may not be of an anisotropic elastic material. In the illustrated embodiments, the tubular elastic body is composed of a plurality of tubular elastic members joined together by adhesion in a unitary form. In an alternative form, firstly a framework may be formed of fibers 27, and then rubber may be coated over the framework, whereupon elastic partitions may be formed in the framework. Thus the configuration according to each of the foregoing embodiments can be achieved without joining a plurality of tubular elastic members together by adhesion. The upper and lower closures may be of a highly rigid material instead of metal, and may be formed integrally with the tubular elastic body so that the joining step can be omitted. Short-fiber reinforced rubber (e.g., fibers having a length of 30 μm and a diameter of 0.3 μm are dispersed in rubber) may be substituted for the anisotropic elastic material. Further, in the modified actuator 161 of FIGS. 13 and 14, the pressures respectively acting in the four pressure chambers 109, 111, 113, 115 may be adjusted in a variety of ways. For example, the pressure only in the pressure chamber 113 may be increased to give a bending motion in the direction 159. Even when the pressure in one of the pressure chambers happens to become impossible to vary due to a possible trouble with the pressure control apparatus independent of the actuator, it is possible to move the actuator by only the remaining pressure chambers. The pressure chambers should be different in volume. The number of the pressure chambers may be selected from a variety of numbers depending on the state of use. The pressure control apparatus may be controlled by an automatic control circuit or by hand. The operating speed and the operating force of the actuator may be controlled as desired.

Figure 30:
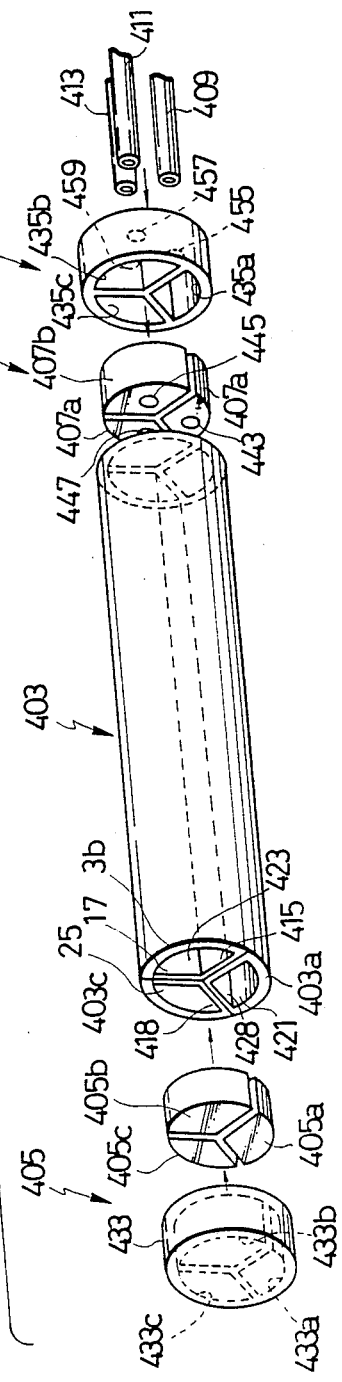
FIG. 30 is an exploded perspective view of the actuator of FIG. 29.

FIGS. 29 and 30 illustrate an actuator 401 according a fourth embodiment of this invention.

As shown in FIG. 29, the actuator 401 generally comprises a tubular elastic body 403 defining an outer peripheral part, an upper closure 405, a lower closure 407, and pipes 409, 411, 413.

Figure 31:
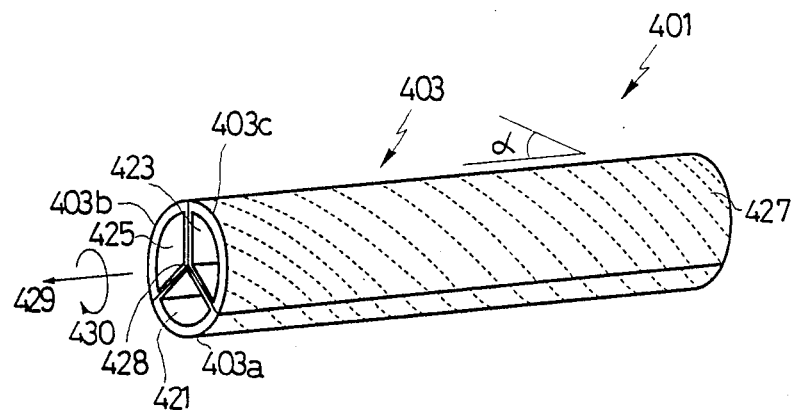
FIG. 31 is a perspective view showing the winding direction of fibers of the actuator of FIG. 29.

The tubular elastic body 403, as shown in FIG. 30, is composed of three identical tubular elastic members 403a, 403b, 403c disposed parallel to one another and joined together by adhesion into a unitary body. The joined part thus defines elastic partitions 415, 417, 419 extending axially of the tubular elastic body 403, and these elastic partitions 415, 417, 419 divides the tubular elastic body 403 into three axial pressure chambers 412, 423, 425. Each of the tubular elastic members 403a, 403b, 403c, as shown in FIG. 31, includes an Aramid fiber (trade name) 427 wound around the axis spirally with fine pitches so as to assume the same winding angle $\alpha$ ($\neq 90°$), and a silicone rubber coated over the fiber. By forming the tubular elastic body 403 from an anisotropic material combined of the fiber 427 and the rubber, a direction small in modulus of longitudinal elasticity is substantially aligned with a direction inclined by the angle of $\alpha$ to the axial direction 429 of the tubular elastic body 403. The tubular elastic body 403 is hardly extendible in the direction inclined by the angle of $\alpha$ because it is large in modulus of elasticity due to the fiber 427, but the elastic body 403 is easily extendible in a direction inclined by an angle of $(90° - \alpha)$.

Figure 32:
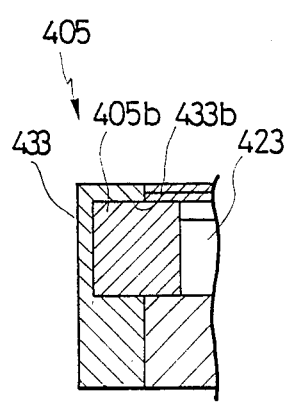
FIG. 32 is an enlarged cross-sectional view taken along line B—B of FIG. 29.

The upper closure 405 includes three fan-shaped upper closure members 405a, 405b, 405c of metal sealing the respective pressure chambers 421, 423, 425 defined by the tubular elastic members 3a, 3b, 3c, and an upper cover member 433 covering over all the upper closure members 405a, 405b, 405c after one end of the individual upper closure member 405a, 405b, 405c has been inserted in the in the respective tubular elastic member 403a, 403b, 403c and joined thereto. The attaching of the upper closure 405 is such as shown in FIG. 32. The upper cover member 433 is in the form of a tube of semicircular cross section and has inside three recesses 433a, 433b, 433c in which the respective upper closure members 405a, 405b, 405c are to be fitted. The outside shape or contour of this upper cover member 433 is identical with that of the tubular elastic body 403.

Likewise, the lower closure 407 includes three fan-shaped lower closure members 407a, 407b, 407c, and a lower cover member 435 covering all the lower closure members 407a, 407b, 407c after one end of the individual lower closure member 407a, 407b, 407c has been inserted in the respective tubular elastic member 403a, 403b, 403c and joined thereto.

Figure 33:
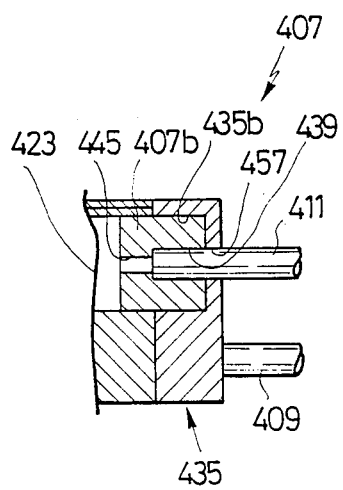
FIG. 33 is an enlarged cross-sectional view taken along line C—C of FIG. 29.

The lower closure members 407a, 407b, 407c, as shown in FIG. 33, have three insertion hole 437, 439, 441 in which the respective pipe 409, 411, 413 is to be inserted. The lower closure members 407a, 407b, 407c also have three communication holes 443, 445, 447, respectively, contiquous to the respective insertion holes 437, 429, 441 for communication between the respective pipes 409, 411, 413 and the corresponding pressure chambers 421, 423, 425. The pipes 409, 411, 413 are sealingly joined to the respective insertion holes 437, 439, 441 by an adhesive. The lower cover member 435 is identical in outside shape with the upper cover member 433 and has three recesses 435a, 435b, 435c in which the respective lower closure members 407a, 407b, 407c are to be fitted. The lower cover member 435 has three insertion holes 455, 457, 459 which communicate with the respective recesses 435a, 435b, 435c and in which the respective pipes 409, 411, 413 are inserted. Consequently, the pressures of the individual pressure chambers 412, 423, 425 can be respectively controlled by supplying to the respective pressure chambers 421, 423 425 operating fluid as adjusted by a pressure control apparatus (not shown) located outside.

Figure 34:
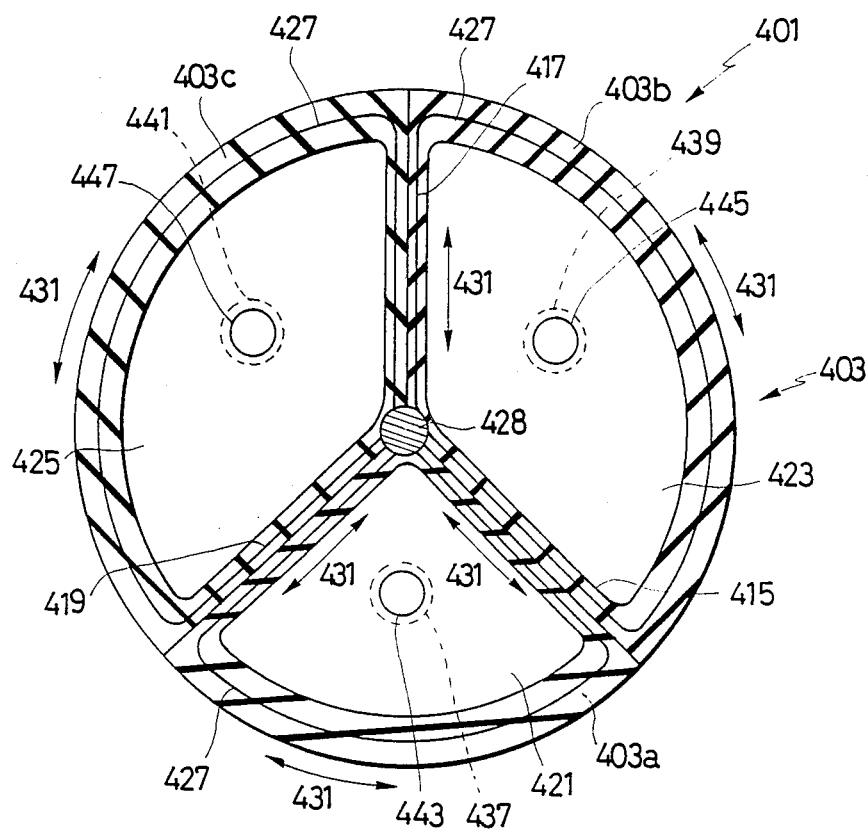
FIG. 34 is an enlarged cross-sectional view taken along line A—A of FIG. 29.

Further, as shown in FIG. 34, a wire 428 of an Aramid (trade name) fiber extends in and through the joint of the three tubular elastic members 403a, 403b, 403c along the center line of the actuator 401, i.e., in the axial direction 429. The wire 428 is longitudinally extendible only to a small extent when a pulling force is exerted thereon.

With this modified construction, if the pressure chambers 421, 423, 425 are pressurized equally, the actuator 401 takes a rotating motion (twist) about the axis under the influence of the wound fiber 427. At that time, since the axial length of the actuator 401 does not vary due to the wire 428, the rotating motion is not accompanied by an elongating motion in the axial direction 429. Yet if the pressure in only the pressure chamber 421 is increased to cause the actuator 401 to take a bending motion in the direction 454, the length of the actuator 401 can take a bending motion, but cannot take any elongating motion in such bending direction at the same time. The fiber 427 is wound with fine pitches so that any expanding motion in the radial direction 431 cannot occur.

In the described embodiment of the actuator which is driven by the energy of fluid, it is possible to achieve multi-degree-freedom movements such as an elongating motion in the axial direction and a rotating motion about the axis. However, a pure rotating motion cannot be achieved. In the actuator according to this embodiment, any elongating motion in the axial direction is restricted by the wire 428 embedded in and extending along the axis of the actuator, it is possible to give a pure rotating motion. Consequently this actuator is particularly useful when used as an arm and/or a hand in an industrial robot which is to shift the orientation of a gripped workpiece or to fasten a screw.

The wire 428 extends along the center line of rotation of the actuator 401 and hence does not obstruct the rotting motion of the actuator 401. Alternatively, the embedding position of the wire 428 may be varied as desired within an range to secure a necessary rotating motion; for example, the wire 428 may extends in and through the pressure chamber. A plurality of wires may be used instead of a single wire. Although the wire 428 is an Aramido (trade name) fiber in the illustrated embodiments, but may be metal wire. Further, by arranging the wire so as to increase the longitudinal elastic coefficient in the axial direction of the actuator 401, it is possible to achieve only a rotating motion.

In this embodiment, the actuator has three pressure chambers; however, this invention is not limited to this specific form. Namely, the number of the pressure chambers may be two, three, four or any else, which can be selected at option to meet with the purpose. The pressure chambers may be different in volume. The proportion of amounts of movements between the rotting motion and the bending and the axially elongating motions can be adjusted by varying the winding angle $\alpha$ of the fiber 427. Although both the tubular elastic body and the elastic partition are formed of an anisotropic elastic material, only the tubular elastic body may be formed of an anisotropic elastic material; that is, the elastic partition may not be of an anisotropic elastic material. In the illustrated embodiments, the tubular elastic body is composed of a plurality of tubular elastic members joined together by adhesion in a unitary form. In an alternative form, firstly a framework may be formed of fibers 427, and then rubber may be coated over the framework, whereupon elastic partitions may be formed in the framework. Thus the configuration according to each of the foregoing embodiments can be achieved without joining a plurality of tubular elastic members together by adhesion.

According to the fourth embodiment of this invention, a pure rotating motion about the axis can be produced by utilizing the energy of fluid.

FIGS. 35 through 38 and FIGS. 39 through 41 illustrate actuators according to fifth and sixth embodiments, respectively, of this invention.

The actuators of the fifth and sixth embodiments are different from the foregoing embodiments in that the angle (winding angle $\alpha$) between the generator of the outer peripheral of the actuator and the reinforcing direction (direction of winding the fiber) is smaller than the angle of equilibrium and also that the actuator takes a motion by utilizing the shrinkage in the axial direction as pressurized.

Before describing the construction of the fifth and sixth embodiments, the principles of operation will now be described.

In the described embodiments of the actuator, since the winding angle $\alpha$ is 90° or slightly smaller than 90°, the individual pressure chambers become expanded in the axial direction due to the respective pressures in the pressure chambers.

To the contrary, if the individual pressure chambers are reinforced in such a manner that the winding angle $\alpha$ is 0° or slightly larger than 0°, the individual pressure chambers become shrunk in the axial direction.

Such motion of the individual pressure chamber is determined by the balance of forces produced on the tubular elastic body of the actuator when pressurized; if the winding angle $\alpha$ takes a certain value, the tubular elastic body assumes a posture neither expanded nor shrunk in the axial direction even when pressurized. Here the value of the winding angle $\alpha$ is called "angle of equilibrium".

In general, this theory has been known for long (e.g., "Composite Material Engineering" edited by Hayashi and issued 1971 from Japan Science and Technology Association), according to which the angle of equilibrium on a simple tubular shell of circular cross section can be theoretically obtained as 54.7°.

In an actuator having a tubular elastic body of which interior is divided into a plurality of pressure chambers by an axially extending partition, partly since the actuator has a complex configuration and partly since the configuration depends on the elastic characteristic of the partition, the angle of equilibrium ranges from about 50° to about 60°, though not absolutely.

The operation of this embodiment will now be described firstly in the case of $\alpha = 0°$. Since the individual pressure chamber becomes shrunk axially when pressurized, it is possible to cause the actuator to become shrunk axially and straightly when the individual pressure chambers are equally pressurized. When different pressures are given to the individual pressure chambers, a difference is created in amount of shrinkage between the pressure chambers so that the actuator takes a bending motion toward the side of the more highly pressurized pressure chamber. The amount of shrinking, angle of bending and direction of bending can be adjusted by controlling the pressures of the individual pressure chambers.

In the case of $0 < \alpha <$ angle of equilibrium, the individual pressure chamber is about to become shrunk, with rotating about the axis, when pressurized. Therefore, the motion the individual pressure chamber when $\alpha = 0°$ is accompanied by a rotating motion about the axis of the actuator.

Yet in this case, if a non-extendible and non-shrinkable wire is embedded in the actuator along the center line thereof, it is possible to avoid any axial motion so that a rotating motion accompanied by no axial motion can be obtained.

As shown in FIG. 35, the actuator 501 generally comprises a tubular elastic body 503 defining an outer peripheral part, an upper closure 505, a lower closure 507, and pipes 509, 511, 513.

The tubular elastic body 503, as shown in FIG. 36, is composed of three identical tubular elastic members 503a, 503b, 503c disposed parallel to one another and joined together by adhesion into a unitary body. The joined part thus defines elastic partitions 515, 517, 519 extending axially of the tubular elastic body 503, and these elastic partitions 515, 517, 519 divides the tubular elastic body 503 into three axial pressure chambers 521, 523, 525. The individual tubular elastic members 503a, 503b, 503c, as shown in FIG. 36, is reinforced by winding a fiber 527 round the pressure elastic members in a direction at an angle $\alpha$ with respect to the generator 529 of the outer periphery of the actuator ($0 \leq \alpha$ angle of equilibrium). For example, if $\alpha = 0$, the outer peripheral part of the actuator is reinforced by winding the fiber in the direction of generator 529.

If $\alpha \neq 0°$, the fibers 527 are wound spirally round the individual tubular elastic members 503a, 503b, 503c, during which time it is preferable to wind a plurality of the fibers round the individual tubular elastic members so as not to widen the inter-fiber pitches.

The upper closure 505 includes three fan-shaped upper closure members 505a, 505b, 505c of metal sealing the respective pressure chambers 521, 523, 525 defined by the tubular elastic members 503a, 503b, 503c. The lower closure 507, like the upper closure 505, includes three fan-shaped lower closure members 507a, 507b, 507c of metal inserted in the tubular elastic members 503a, 503b, 503c and sealing the same. The lower closure members 507a, 507b, 507c has three through holes 543, 545, 547 in which three pipes 509, 511, 513 are inserted and fixed so that the pressures in the individual pressure chambers 521, 523, 525 can be controlled via the corresponding pipes 509, 511, 513 by a non-illustrated pressure apparatus outside.

Firstly the operation of this actuator 501 will now be described in the case of $\alpha = 0°$. The actuator 501 is hardly extendible in the axial direction 529 and is easily extendible in the circumferential direction perpendicular to the axial direction. Therefore assuming that the operating fluid is supplied from the pipe 509 into the pressure chamber 521 to increase the pressure therein, the pressure chamber 521 is about to become shrunk in the axial direction 529 with expanding radially. As a result, the actuator takes a bending motion in the direction 554. Likewise, as the pressure chambers 519, 521 are pressurized concurrently, the actuator 501 takes a bending in the direction 558. Further, if the three pressure chambers are pressurized equally, the actuator becomes shrunk in the axial direction 529 with keeping its straight posture. By thus controlling the pressures of the three pressure chambers 521, 523, 525 with utilizing the characteristic of an anisotropic elastic material, it is possible to locate the distal end of the actuator 501 in an optional point set within the range of movement.

Secondly the operation of this actuator 501 will now be described in the case of $\alpha \neq 0°$ ($0 < \alpha <$ angle of equilibrium). As each pressure chamber is pressurized, like when $\alpha = 0°$, the actuator 501 is about to become shrunk in axial direction 529 with expanding radially. Concurrently with this, the actuator 501 takes a rotating motion about the axis in such a direction that the spirally wound fibers 527 becomes loose.

Thus by controlling the pressures of the three pressure chambers 521, 523, 525 with utilizing the characteristic of an anisotropic elastic material, it is possible to cause the actuator 501 to take a bending motion in an optional direction and an elongating motion in the axial direction, with rotating about the axis.

Various modifications and changes in method of production, structure, etc. may be possible as follows.

The number of the pressure chambers may be two, three, four or any else, which can be selected at option to meet with the purpose. If the tubular elastic body 503 has no elastic partition, that is, if the actuator has only a single pressure chamber, the actuator can take only an elongating motion in the axial direction and a rotating motion.

Figure 37:
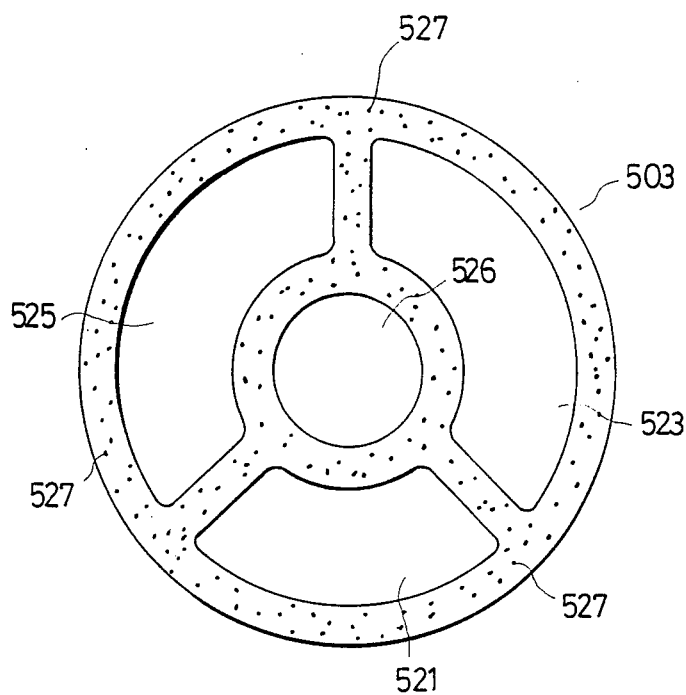
FIG. 37 is an enlarged transverse cross-sectional view of a tubular elastic body according to a modification of the fifth embodiment.

As shown in FIG. 37, the modified actuator may have a through hollow portion 526 in which pressure is not to be controlled. Apart from this through hollow portion 526, the modified actuator is identical in construction with the fifth embodiment; therefore its detailed description has been omitted here for clarity, with similar parts being only designated by like reference numerals.

With this modified actuator, though there is a space in which pressure is not adjusted, a uniform degree of freedom can be secured in all directions, and hence a stable motion of the actuator can be realized. Further, if many pipes or wires are threaded through the through hollow portion 526, those contents are protected against the external force as the pressures of the pressure chambers 521, 523, 525 around perform a cushion role, thus eliminating the fear of breaking or damaging the contents. Alternatively, there may be two or more spaces, such as the through hollow portion 526, in which pressures are not to be adjusted; one space for insertion of the contents, and the other for passage of fluid.

Figure 38:
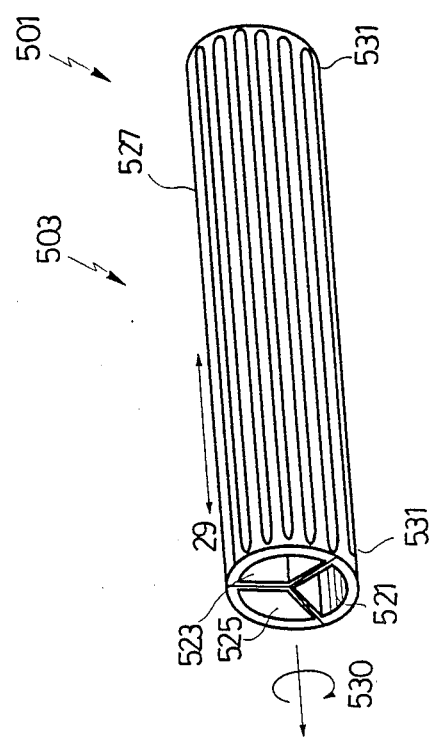
FIG. 38 is a general perspective view of another modification of the fifth embodiment.

An alternative way of imparting anisotropy to the actuator will now be described. In the fifth embodiment, three tubular elastic members 503a, 503b, 503c are formed of rubber, and then each tubular elastic member is reinforced with fibers, and finally these three tubular elastic members are arranged parallel to the axial direction and joined together, thus providing an actuator in a unitary form. But after extrusion molded using a core of a cross-sectional shape substantially similar to that of the pressure chambers, a fiber is wound round the resulting tubular elastic body (in the case of $\alpha \neq 0°$), or in the case of $\alpha = 0°$, as shown in FIG. 38, fibers are joined (joined part 531) to opposite ends of the resulting tubular elastic body and attached to its outer peripheral surface in the direction of generators. Thus if the tubular elastic body and the elastic partition are extrusion molded concurrently, the elastic partition is not reinforced; but if at least the outer peripheral part is anisotropic, the actuator can work properly. Thereafter, rubber may be coated over the fibers, or the fibers are attached to the tubular elastic body by an elastically deformable adhesive. At that time, it is not absolutely necessary to join the fibers tightly to the tubular elastic body along the entire length thereof; that is, the fibers may be fixed only at opposite ends.

In the illustrated embodiments, long fibers are used as a reinforcing material to achieve a one-way reinforcement; but this invention should by no means be limited to this specific form.

For example, short fibers may be used instead of long fibers. It is a common knowledge that if the short fibers are dispersed in rubber and the resulting compound is extrusion molded on dice, the short fibers are usually arranged in the extruding direction. Consequently the tubular elastic body is high in elastic coefficient in the axial direction and can be used for the actuator of $=0°$.

Figure 41:
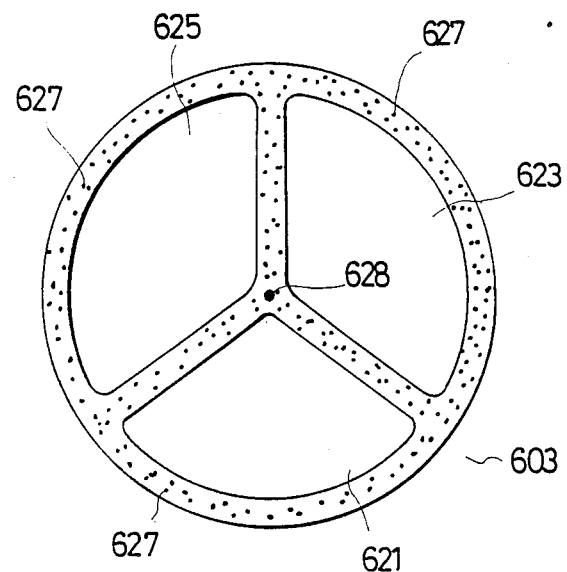

FIGS. 39 to 41 illustrate a sixth embodiment which is different from the fifth embodiment in that a wire 628 is embedded in the tubular elastic body along the center axis of the actuator. As to the other construction, various modifications and changes discussed in connection with the fifth embodiment may be adopted. The wire 628 may be a metal wire or a plastic slender rod capable of bending and twisting to some extent and hardly extendible and contractible in the axial direction. The winding angle is not $0°$.

In operation, as three pressure chambers 619, 621, 623 are pressurized equally, the actuator 605, like that of the fifth embodiment, is about to become shrunk with rotating about the axis. At that time, the motion in the axial direction is restricted by the wire 628 so that only a rotating motion about the axis can be taken effect. Further, if only the pressure chamber 621 is pressurized, the actuator can take a bending motion in the direction 654 with remaining its axial length.

Thus in the fifth and sixth embodiments, when the winding angle $\alpha$ is smaller than the angle of equilibrium, the actuator as pressurized can take a shrinking motion in the axial direction (in the case $\alpha=0$), or a shrinking motion with rotating about the axis (in the case $\alpha\neq 0$, and a bending motion in an optional direction. Further, if a wire is embedded in the tubular elastic body along the central axis thereof, it is possible to achieve a pure rotating motion accompanied by no axial shrinking.

The described embodiment actuator is driven by fluid pressure acting on the end cross section of the individual pressure chamber, while the actuator according to the fifth and sixth embodiments are driven chiefly by fluid pressure acting on the lateral side surface of the individual pressure chamber. Therefore, even though the end cross-sectional areas of the individual pressure chamber become smaller due to the reduction in diameter, insertion of the wire, etc, the actuator is free from being lowered in operating force.

FIGS. 42 through 49 illustrate an actuator 701 according to a seventh embodiment of this invention. The actuator 701 includes a tubular elastic body 702 made of rubber or a similar material and having a substantially elongated rectangular cross section, an upper closure 703, a lower closure 704, a pipe 705, and a reinforcing member 706 made of a material (metal sheet or plastics) having an elastic coefficient higher than that of the tubular elastic body 702. The reinforcing member 706 has a size enough to completely cover the bottom surface of the tubular elastic body 702, and is fixedly joined to the bottom surface. The upper and lower closures 703, 704 are fixedly joined to the tubular elastic body 702 near the opposite ends, thus defining a pressure chamber 707 inside the actuator 701. The pressure chamber 707 is filled with fluid (air in this embodiment) and is connected with the pipe 705 for fluid communication with the exterior, thus keeping the actuator 701 free from any leak of fluid from the joints between the tubular elastic body 702 and the upper and lower closures 703, 704.

With this arrangement, by varying the pressure in the pressure chamber 707 by a non-illustrated control apparatus outside, it is possible to cause the actuator 701 to bend to an optional extent, as indicated in phantom lines in FIG. 42(c). Since the bottom side of the actuator 701, i.e., the side covered by the reinforcing member 706 are hardly elastically deformable, compared to the other portions, the entire actuator 701 bends to the side of the reinforcing member 706. Now if the pressure in the pressure chamber 707 is reduced to the original level, then the actuator 701 restores its original shape.

Using this actuator 701, it is possible to reduce the diameter adequately and to achieve a smooth motion, compared to the conventional actuator which takes a bending motion by the action of bellows. The actuator 701 is simple in construction. As mentioned above, since the amount of bending can be adjusted as desired by varying the pressure in the pressure chamber.

FIG. 43 illustrates an actuator 711 according to a first modification of the seventh embodiment. The actuator 711 is similar in construction to the actuator 701 of the seventh embodiment, except that the cross-sectional shape of a tubular elastic body 712 is substantially semi-circular. With this construction, it is possible to avoid any unnecessary expansion resulting from the local pressure acting on the corners of the tubular elastic body, thus realizing an effective bending motion.

FIG. 44 illustrates a modified actuator 721. The actuator 721 is different from the actuator 711 of FIG. 43 only in that a tubular elastic body 722 is formed from an anisotropic elastic material. The anisotropic elastic material comprises Aramid (trade name) fibers 728 wound spirally round the tubular elastic body 722, and silicone rubber coated over the fibers 728. The arrangement of the fibers 728 in the body structure is such that the direction in which the longitudinal elastic coefficient is small is the axial direction of the actuator 721. With this actuator 721, it is possible to avoid any unnecessary expansion of the tubular elastic body with maximum reliability, thus realizing a more effective bending motion.

FIG. 45 illustrates an actuator 731 according to a second modification of the seventh embodiment. The actuator 731 is different from the foregoing modification in that it does not use any reinforcing member 706 and gives anisotropy only to the bottom part of the tubular elastic body 732. In the first modification, the one and the same kind of material is used. In the second modification, the direction in which the longitudinal elastic coefficient is large is the axial direction of the actuator 731. With this actuator 731, since the elastic coefficient of the bottom part is larger than that of the remaining part, it is possible to realize an effective bending motion like the foregoing three actuators 701, 711, 721.

FIG. 46 illustrates an actuator 741 according a third embodiment. The actuator 741 comprises a tubular elastic body 742 having a circular cross section and coated with a fluid-state polymer material 749, instead of Aramid ©trade name) fibers and the reinforcing member, along the axis of the tubular elastic body 742. After curing, this polymer material 749 has a hardness different from that of the tubular elastic body 742. With this construction, the actuator 741 is easy to manufacture.

FIG. 47 illustrates an actuator 751 according to a fourth modification of the seventh embodiment. In this fourth modification, Aramid (trade name) fibers are arranged both in the upper and bottom parts of a tubular elastic body 752 so that the actuator 751 can bend in a generally S-shaped fashion. The actuator 751 is a composite structure composed of a pair of half parts; one half part is vertically opposite to the other part, and the individual half part has a structure substantially corresponding to one half part of the actuator 728 of the second modification. With this construction, the actuator 751 can move into a complex shape instantly.

In the foregoing embodiments and modifications, the actuator is formed by joining the tubular elastic body, the upper closure and the lower closure together into a unitary form. But these three component parts may be formed from either the same material or different materials. The cross-sectional shape of the actuator should by no means be limited to the illustrated examples and may be a combination of an optional structure and an optional cross-sectional shape. Further, for achieving different elastic coefficients between various parts, any other method apart from the disclosed examples may be employed of course. Still further, it is also possible to vary the elastic coefficient optionally at local areas.

Figure 48:
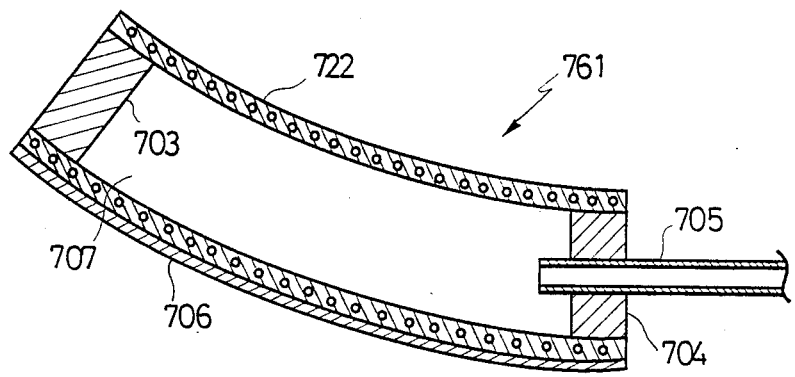
Figure 48:
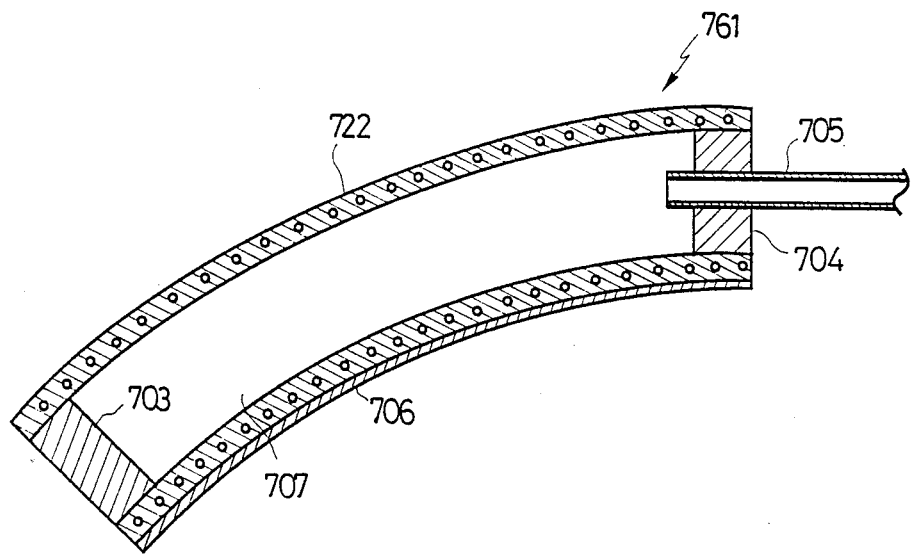

FIG. 48 illustrates an actuator 761 according to a fifth modification of the seventh embodiment. The actuator 761 normally assumes, in free form, an upwardly curved posture, as shown in (a) of FIG. 48, and takes a downwardly bending motion when the pressure chamber 707 is pressurized. Thus the actuator 761 can take a curbing motion either upwardly or downwardly. The structure and cross-sectional shape may be alternative as desired.

Figure 49:
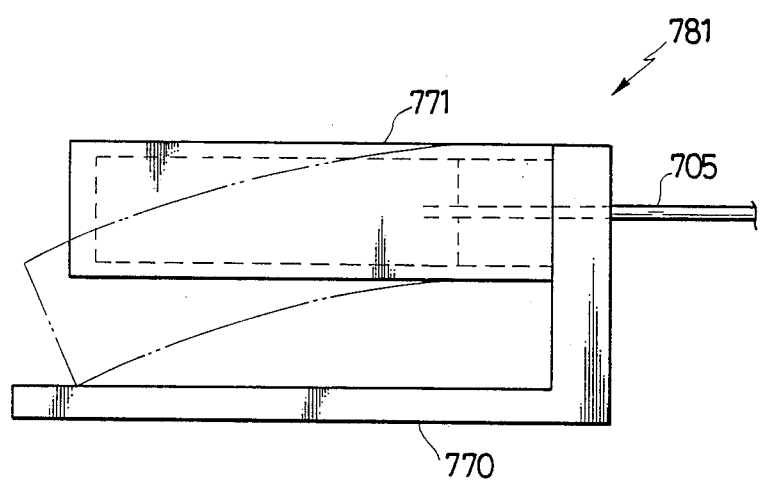
FIG. 49 is a side elevational view of an arm of a robot to which the actuator of the seventh embodiment is applied.

FIG. 49 illustrates an arm of a robot in which an actuator 771 of this invention is incorporated. As shown in FIG. 49, the actuator 771 is fixed to a holder 780 in the form of a generally L-shaped hard member such as of metal, constituting a hard-type actuator 781 for gripping a workpiece. If a relatively soft material is used at the surfaces engageable with the workpiece, it is possible to relax or absorb a possible excessive force exerted on the workpiece. Alternatively, any of the remaining actuators described above may be employed in this robot arm.

Various modifications will become possible for those skilled in the art after receiving the teachings of the present disclosure without departing from the scope thereof.

What is claimed is:
1. An actuator comprising:
   (a) a tubular elastic body of which interior is separated into a plurality of pressure chambers by an axially extending partition; and
   (b) means for adjusting respective pressures of said pressure chambers.
2. The actuator according to claim 1, wherein the respective pressures of said pressure chambers are adjusted to render said tubular elastic body to take a motion at a one-degree freedom.
3. The actuator according to claim 1, wherein the respective pressures of said pressure chambers are adjusted to render said tubular elastic body to take a motion at a multi-degree freedom.
4. The actuator according to claim 1, wherein at least an outer peripheral part of said tubular elastic body has an anisotropy with respect to modulus of elasticity.
5. The actuator according to claim 4, wherein an axial direction of said tubular elastic body is a direction small in modulus of longitudinal elasticity.
6. The actuator according to claim 4, wherein a direction perpendicular to the axial direction of said tubular elastic body is a direction large in modulus of longitudinal elasticity.
7. The actuator according to claim 3, wherein at least an outer peripheral part of said tubular elastic body has an anisotropy with respect to modulus of elasticity.
8. The actuator according to claim 7, wherein an axial direction of said tubular elastic body is a direction small in modulus of longitudinal elasticity.
9. The actuator according to claim 8, wherein a direction perpendicular to the axial direction of said tubular elastic body is a direction large in modulus of longitudinal elasticity.
10. The actuator according to claim 4, wherein said outer peripheral part of said tubular elastic body is composed of at least one fiber spirally wound around the axis of said tubular elastic body.
11. The actuator according to claim 10, wherein said outer peripheral part of said tubular elastic body is further composed of elastic material coated over said fibers.
12. The actuator according to claim 2, wherein a direction small in modulus of longitudinal elasticity in a direction different from an axial direction of said tubular elastic body, there being a wire in said tubular elastic body.
13. The actuator according to claim 12, wherein the wire is extended in and through said tubular elastic body axially thereof.
14. The actuator according to claim 1, comprising a plurality of said tubular elastic bodies connected axially.
15. The actuator according to claim 14, wherein at least one of said tubular elastic bodies has a shape different from those of the other tubular elastic bodies.
16. The actuator according to claim 14, wherein shapes of all of said tubular elastic bodies are same each other.
17. The actuator according to claim 14, further comprising a plurality of reinforcing members of a hardly elastically deformable quality connected alternately with said tubular elastic bodies, each of said tubular elastic bodies having a plurality of holes though which the pressures of said pressure chambers are to be transmitted between said connected tubular elastic bodies.
18. The actuator according to claim 17, wherein said tubular elastic bodies and the reinforcing members are thin boards thinned in those axial direction.
19. The actuator according to claim 1, wherein at least outer peripheral part of said tubular elastic body has an anisotropy with respect to modulus of elasticity, a reinforcing direction of said tubular elastic body being a direction at an angle less than an angle of equilibrium with respect to the generator of an outer peripheral part of said tubular elastic body.
20. The actuator according to claim 1, wherein at least outer peripheral part of said tubular elastic body has an anisotropy with respect to modulus of elasticity, a reinforcing direction of said tubular elastic body being a direction at an angle more than an angle of equilibrium with respect to the generator of an outer peripheral part of said tubular elastic body.

21. The actuator according to claim 1, wherein said pressure adjusting means includes means for supplying an actuating fluid to each said pressure chamber.

22. The actuator according to claim 3, wherein said direction small in modulus of longitudinal elasticity is a direction inclined from the axial direction of said tubular elastic body.

23. The actuator according to claim 19, wherein said tubular elastic body has a wire embedded therein along the central axis.

24. The actuator according to claim 1, wherein said tubular elastic body has a through hollow portion in which pressure is not to be controlled.

25. The actuator according to claim 1, wherein said tubular elastic body is formed by extrusion molding on dice.

26. The actuator according to claim 25, wherein said tubular elastic body includes short fibers.

27. An actuator comprising:
  (a) a tubular elastic body of which interior is separated into a plurality of pressure chambers by an axially extending partition, said tubular elastic body being composed of a plurality of tubular elastic members joined together, each of said tubular elastic members defining a respective one of said pressure chambers; and
  (b) means for adjusting respective pressures of said pressure chambers.

28. The actuator according to claim 27, wherein the respective pressures of said pressure chambers are adjusted to render said tubular elastic body to take a motion at one-degree freedom.

29. The actuation according to claim 27, wherein the respective pressures of said pressure chambers are adjusted to render said tubular elastic body to take a motion at a multi-degree freedom.

30. The actuator according to claim 27, wherein at least an outer peripheral part of said tubular elastic body has an anisotropy with respect to modulus of elasticity.

31. The actuator according to claim 30, wherein an axial direction of said tubular elastic body is a direction small in modulus of longitudinal elasticity.

32. The actuator according to claim 31, wherein a direction perpendicular to the axial direction of said tubular elastic body is a direction large in modulus of longitudinal elasticity.

33. The actuator according to claim 27, wherein each said tubular elastic member is composed of at least one fiber spirally wound around the respective pressure chamber, and rubber coated over said fibers.

34. An actuator comprising:
  (a) a first elastic member;
  (b) a second elastic member attached to said first elastic member and having a modulus of elasticity different from that of said first elastic member, at least one of said first and second elastic members having therein a pressure chamber; and
  (c) means for adjusting a pressure in said pressure chamber.

35. The actuator according to claim 34, wherein the second elastic member made of a material having an elastic coefficient higher than that of the first elastic member.

36. The actuator according to claim 35, wherein the first elastic member has the pressure chamber therein.

37. The actuator according to claim 36, wherein the first elastic member bends to the side of the second elastic member when the pressure in said pressure chamber is adjusted by said adjusting means.

38. The actuator according to claim 37, wherein the first elastic member has a substantially enlongated rectangular cross section.

39. The actuator according to claim 37, wherein the first elastic member has a substantially semicircular cross section.

40. The actuator according to claim 36, wherein the first elastic member is formed from an anisotropic elastic material.

41. The actuator according to claim 37, wherein the second elastic member comprises a liquid-state material coated to the first elastic member.

42. The actuator comprising:
  (a) an elastic member having a pressure chamber therein, at least one portion of said elastic member having an anisotropy with respect to modulus of elasticity; and
  (b) means for adjusting a pressure in said pressure chamber.

43. The actuator according to claim 42, wherein at least one portion of said elastic member is a bottom part of said elastic member.

44. The actuator according to claim 42, wherein at least one portion of said elastic member is upper and bottom parts of said elastic member.

45. The actuator according to claim 36, further comprising:
  a holder fixed said first elastic member for gripping a workpiece with said first elastic member, the pressure in the pressure chamber of which is adjusted.

46. The actuator according to claim 42, further comprising:
  a holder fixed said elastic member for gripping a workpiece with said elastic member, the pressure in the pressure chamber of which is adjusted.

* * * * *